(12) United States Patent
Nakamoto et al.

(10) Patent No.: US 8,948,912 B2
(45) Date of Patent: Feb. 3, 2015

(54) SERVICE PROVIDING SYSTEM AND SERVICE PROVIDING METHOD

(71) Applicant: Kabushiki Kaisha Yaskawa Denki, Kitakyushu (JP)

(72) Inventors: Zenta Nakamoto, Kitakyushu (JP); Makoto Umeno, Kitakyushu (JP); Kenji Matsukuma, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/710,496

(22) Filed: Dec. 11, 2012

(65) Prior Publication Data

US 2013/0103198 A1  Apr. 25, 2013

Related U.S. Application Data

(63) Continuation of application No. PCT/JP2011/063287, filed on Jun. 9, 2011.

(30) Foreign Application Priority Data

Jun. 11, 2010 (JP) ................. 2010-133981
Jul. 23, 2010 (JP) ................. 2010-166423
Nov. 24, 2010 (JP) ................. 2010-261275

(51) Int. Cl.
*B25J 9/16* (2006.01)
*G07F 17/26* (2006.01)
(Continued)

(52) U.S. Cl.
CPC ................. *B25J 9/161* (2013.01); *G07F 17/26* (2013.01); *G07F 11/70* (2013.01); *A23G 9/288* (2013.01); *B25J 9/0003* (2013.01); *B25J 9/0084* (2013.01); *B25J 9/0087* (2013.01)

USPC .......... 700/233; 700/235; 700/257; 700/243; 700/241

(58) Field of Classification Search
USPC ......................... 700/233, 235, 241–244, 257
See application file for complete search history.

(56) References Cited

U.S. PATENT DOCUMENTS 5,546,316 A     8/1996  Buckley et al.
5,878,910 A *   3/1999  Gibernau et al. ......... 221/150 A
(Continued)

FOREIGN PATENT DOCUMENTS

CN      2169985 Y       6/1994
JP      01-281567       11/1989
(Continued)

OTHER PUBLICATIONS

International Search Report for corresponding International Application No. PCT/JP2011/063287, Sep. 13, 2011.
(Continued)

*Primary Examiner* — Michael K Collins
(74) *Attorney, Agent, or Firm* — Mori & Ward, LLP

(57) ABSTRACT

A service providing system according to an embodiment includes a robot unit, an interface that receives input of order input information, and a control unit that is connected to the robot unit and the interface, and causes the robot unit to execute an operation based on the order input information input with the interface. Furthermore, the service providing system receives input of the order input information with the interface, causes the robot unit to execute the processing operation based on the order input information input with the interface, and provides a product on which the processing operation has been performed by the robot unit.

15 Claims, 19 Drawing Sheets

(51) Int. Cl.
*G07F 11/70* (2006.01)
*A23G 9/28* (2006.01)
*B25J 9/00* (2006.01)

(56) References Cited

U.S. PATENT DOCUMENTS

| | | | | |
|---|---|---|---|---|
| 5,997,924 | A * | 12/1999 | Olander et al. | 426/296 |
| 6,053,359 | A * | 4/2000 | Goulet et al. | 221/221 |
| 6,442,451 | B1 * | 8/2002 | Lapham | 700/245 |
| 6,473,666 | B1 * | 10/2002 | Samura | 700/117 |
| 7,017,777 | B1 * | 3/2006 | Dixon | 221/24 |
| 7,266,423 | B2 * | 9/2007 | Simmons | 700/233 |
| 7,317,965 | B2 * | 1/2008 | Koyama | 700/233 |
| 7,577,498 | B2 | 8/2009 | Jennings et al. | |
| 2004/0169048 | A1 * | 9/2004 | Simmons | 221/92 |
| 2006/0043111 | A1 | 3/2006 | Jennings et al. | |
| 2007/0267087 | A1 | 11/2007 | Jones et al. | |
| 2013/0103198 | A1 * | 4/2013 | Nakamoto et al. | 700/257 |

FOREIGN PATENT DOCUMENTS

| | | |
|---|---|---|
| JP | 07-192166 | 7/1995 |
| JP | 2007-109072 | 4/2007 |
| JP | 2009-525549 | 7/2009 |
| JP | 4632065 B2 | 2/2011 |
| WO | WO 2007/037130 | 4/2007 |
| WO | WO 2007/090165 | 8/2007 |

OTHER PUBLICATIONS

Written Opinion for corresponding International Application No. PCT/JP2011/063287, Sep. 13, 2011.
Japanese Decision of a Patent Grant for corresponding JP Application No. 2010-166423, Oct. 1, 2013.
Chinese Office Action for corresponding CN Application No. 201180028197.4, Nov. 26, 2014.

* cited by examiner

SERVICE PROVIDING SYSTEM AND SERVICE PROVIDING METHOD

CROSS-REFERENCE TO RELATED APPLICATIONS

This application is a continuation of PCT international application Ser. No. PCT/JP2011/063287 filed on Jun. 9, 2011 which designates the United States, and which claims the benefit of priority from Japanese Patent Application No. 2010-133981, filed on Jun. 11, 2010; Japanese Patent Application No. 2010-166423, filed on Jul. 23, 2010; Japanese Patent Application No. 2010-261275, filed on Nov. 24, 2010; the entire contents of all of which are incorporated herein by reference.

FIELD

The present invention relates to a service providing system and a service providing method.

BACKGROUND

Japanese Patent Laid-open Publication 2007-109072 proposes an unmanned store having a function of carrying ordered foods and drinks to a bar table.

Systems such as the vending machines and the unmanned stores, unmanned selling systems that can provide a service of carrying products to a table as described in Japanese Patent Laid-open Publication 2007-109072 have been proposed.

SUMMARY

According to an aspect of the embodiments, a service providing system includes a robot unit, an interface, and a control unit. The interface receives input of order input information. The control unit is connected to the robot unit and the interface and causes the robot unit to execute an operation based on the order input information input with the interface.

BRIEF DESCRIPTION OF DRAWINGS

A more complete appreciation of the embodiments and many of the attendant advantages thereof will be readily obtained as the same becomes better understood by reference to the following detailed description when considered in connection with the accompanying drawings, wherein.

DESCRIPTION OF EMBODIMENTS

Hereinafter, embodiments of a service providing system and a service providing method disclosed in the present application will be explained in detail with reference to the accompanying drawings. This invention is not limited to the following embodiments.

First Embodiment

In the embodiment, an unmanned soft-serve ice cream preparation providing system that prepares soft-serve ice cream in accordance with an order is described as an example of a service providing system.

Figure 1:
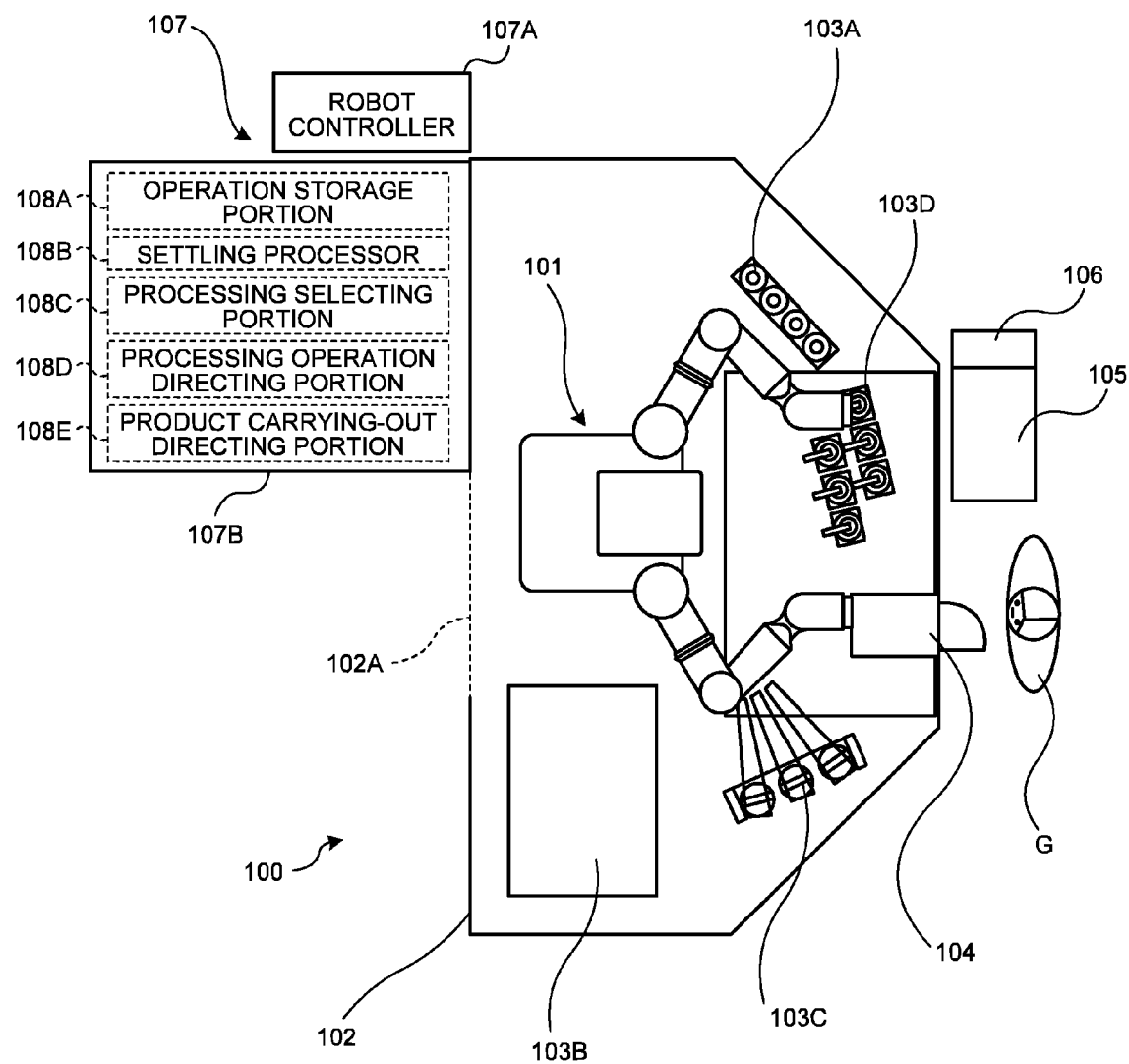
FIG. 1 is a schematic top view for explaining a service providing system according to a first embodiment of the invention.
Figure 2:
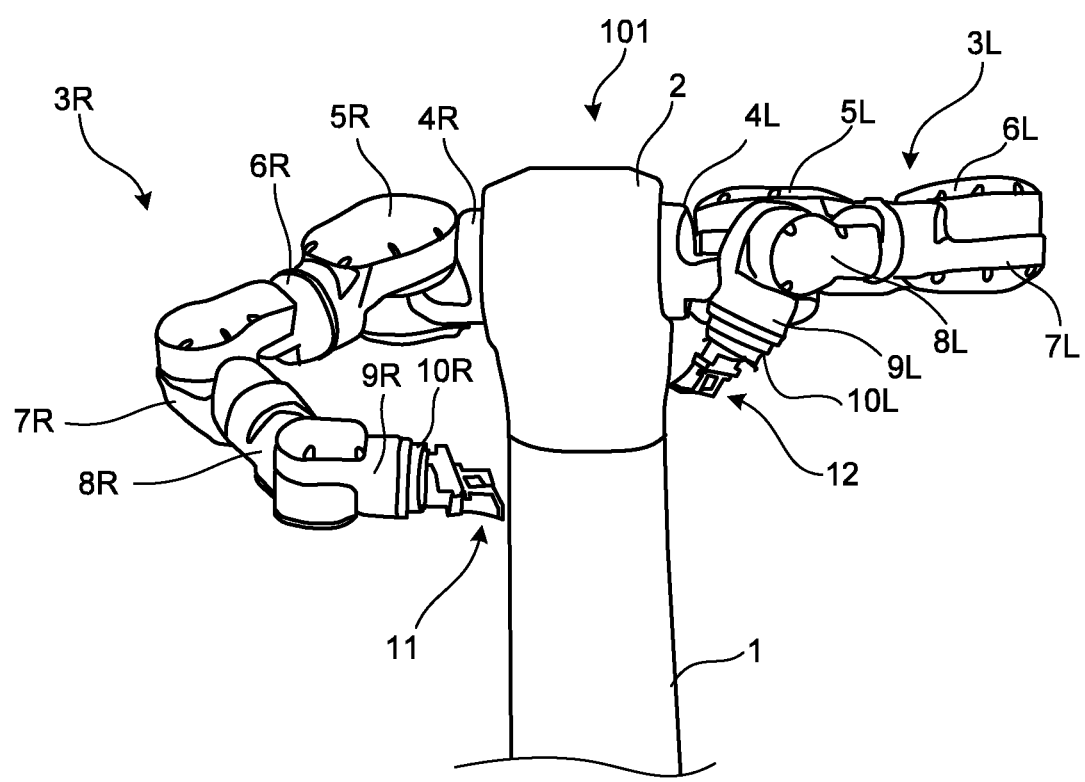
FIG. 2 is a schematic view for explaining main parts of a robot unit according to the first embodiment.
Figure 3:
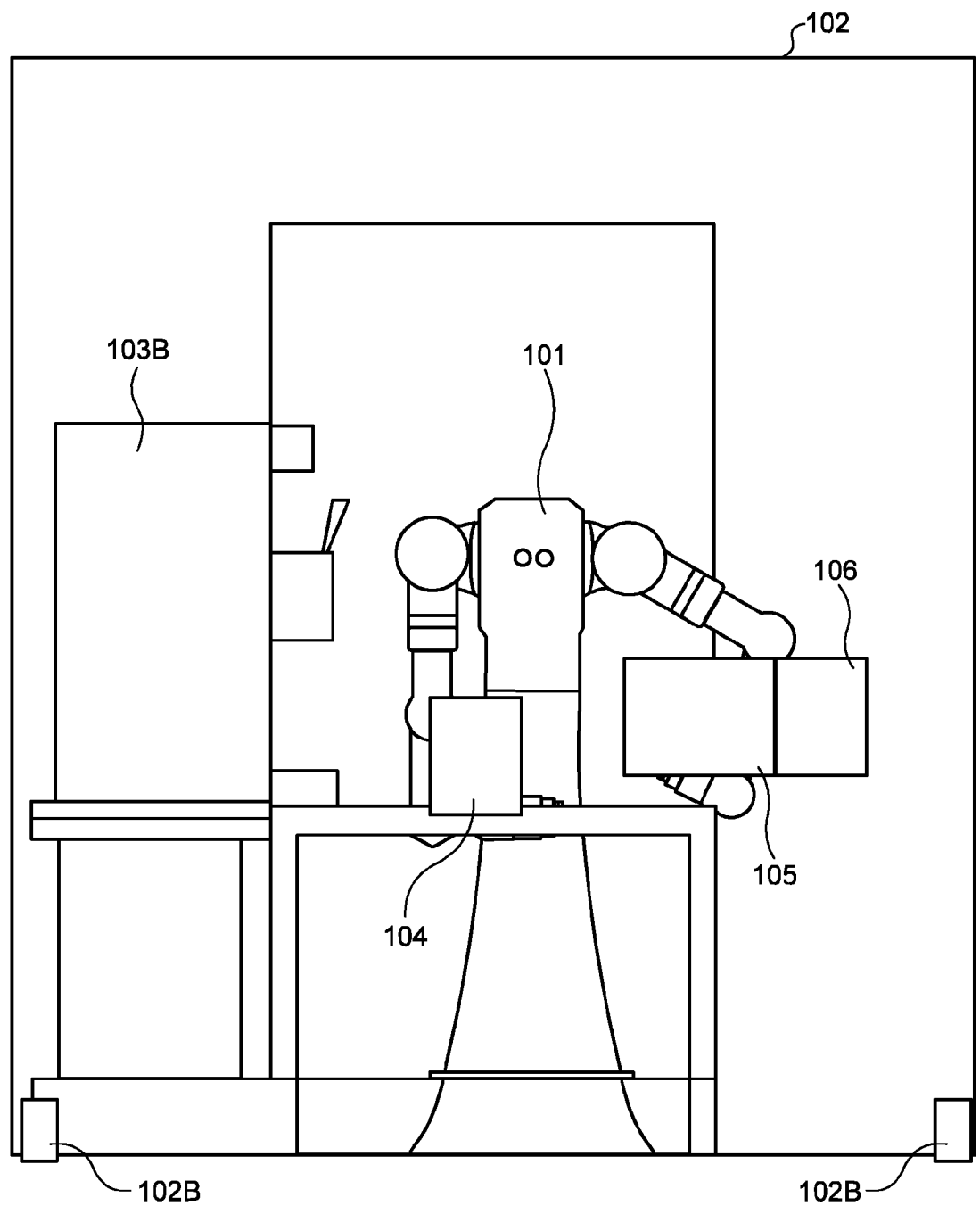
FIG. 3 is a schematic front view for explaining the service providing system according to the first embodiment.
Figure 4:
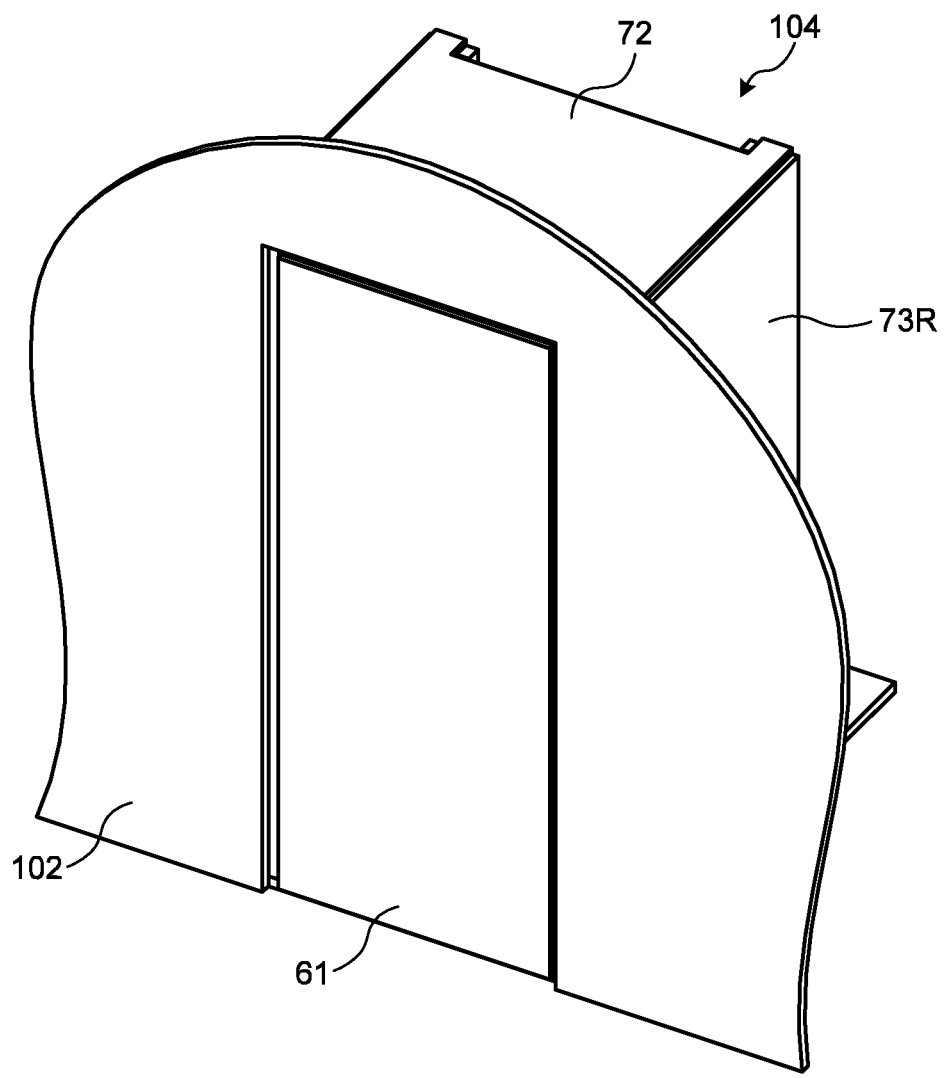
FIG. 4 is a schematic perspective view for explaining a product delivery device according to the first embodiment.

As illustrated in FIG. 1 to FIG. 3, a service providing system 100 according to the embodiment is configured by including a robot unit 101, a housing 102, various types of material supply devices 103A to 103D as one of a product processing unit, a product delivery device (carrying-in/out port) 104, an input touch panel (interface, settling unit) 105, a money charger (settling unit) 106, and an overall computer system (control unit) 107.

As illustrated in FIG. 2, on the robot unit 101, a foundation 1 is fixed to floor with an anchor bolt (not illustrated) and a body portion 2 is provided on the foundation 1 in such a manner that the body portion 2 can revolve with respect to the foundation 1 through an actuator. A first arm 3L and a second arm 3R are provided on the body portion 2 at right and left sides.

A right shoulder portion 4R is provided on the second arm 3R so as to revolve along a horizontal surface (surface parallel with the floor). A right upper arm A portion 5R is provided on the right shoulder portion 4R in a swingable manner. A right upper arm B portion 6R is provided on a front end of the right upper arm A portion 5R. It is to be noted that a revolving torsion operation is given to the right upper arm B portion 6R.

Furthermore, a right lower arm portion 7R is provided on a front end of the right upper arm B portion 6R in a swingable manner. A right wrist A portion 8R is provided on a front end of the right lower arm portion 7R, and a right wrist B portion 9R is provided on a front end of the right wrist A portion 8R. It is to be noted that a revolving torsion operation is given to the right wrist A portion 8R, and a revolving operation of performing a bending operation is given to the right wrist B portion 9R. A right flange 10R is provided on a front end of the right wrist B portion 9R, and a right hand 11 is attached to the right flange 10R.

The first arm 3L is symmetric to the second arm 3R. The first arm 3L is constituted by a left shoulder portion 4L, a left upper arm A portion 5L, a left upper arm B portion 6L, a left lower arm portion 7L, a left wrist A portion 8L, a left wrist B portion 9L, and a left flange 10L.

A left hand 12 is attached to the left flange 10L. Actuators (not illustrated) each having a servo motor are incorporated in joint portions (revolving portions, swinging portions, hands) of the robot unit 101. A rotating position of each movable portion is input to a robot controller 107A as a signal from an encoder incorporated in each actuator.

That is to say, the body portion 2 and the right shoulder portion 4R, the right shoulder portion 4R and the right upper arm A portion 5R, the right upper arm A portion 5R and the right upper arm B portion 6R, the right upper arm B portion 6R and the right lower arm portion 7R, the right lower arm portion 7R and the right wrist A portion 8R, the right wrist A portion 8R and the right wrist B portion 9R, the right wrist B portion 9R and the right flange 10R are rotated relatively by driving of the respective actuators.

In the same manner, the body portion 2 and the left shoulder portion 4L, the left shoulder portion 4L and the left upper arm A portion 5L, the left upper arm A portion 5L and the left upper arm B portion 6L, the left upper arm B portion 6L and the left lower arm portion 7L, the left lower arm portion 7L and the left wrist A portion 8L, the left wrist A portion 8L and the left wrist B portion 9L, the left wrist B portion 9L and the left flange 10L are rotated relatively by driving of the respective actuators.

That is to say, the first arm 3L and the second arm 3R are perpendicular multijoint robots each having seven degrees of freedom. The entire robot unit 101 has fifteen degrees of freedom with the first arm 3L and the second arm 3R in addition to the actuator that makes the foundation 1 and the body portion 2 revolve.

It is to be noted that the robot unit 101 is configured by the perpendicular multijoint robots each having seven degrees of freedom with the redundant degree of freedom. This makes it easy to prevent peripheral substances and the robot unit 101 itself from being interfered with each other in a limited space of the housing 102. Therefore, the housing 102 can be configured to be more compact. However, the degree of freedom of the robot unit 101 is not necessarily limited to that in the embodiment and it is sufficient that the robot unit 101 has equal to or more than one degree of freedom.

The housing 102 is provided so as to separate the robot unit 101 and a space (internal space) that surrounds the robot unit 101 and in which the robot unit 101 is present from the outside. The housing 102 fixes the robot unit 101 and the material supply devices 103A to 103D. Furthermore, a periphery of the housing 102 is covered with a plate that is transparent and is not easy to be broken, such as polycarbonate. With this, the housing 102 has a function as a protection plate as a security measure for a customer G and a function of enabling the customer G to recognize a preparation operation by the robot unit 101 visually.

It is to be noted that an access hole 102A for enabling a management operator of the system to perform a maintenance operation in the housing 102 is provided on the housing 102. The access hole 102A is closed and locked when service is provided normally. Furthermore, the housing 102 is configured so as to be folded after the material supply devices 103A to 103D are detached. In addition, wheels 102B are provided on a lower surface of the housing 102 such that the housing 102 can be conveyed.

The material supply devices 103A to 103D are installed in the internal space of the housing 102. In the embodiment, the material supply device 103A is a cone dispenser in which a plurality of types of soft-serve ice cream cones are stocked. The material supply device 103B is a soft-serve ice cream server and a soft-serve ice cream server for general service is applied to the material supply device 103B. The material supply device 103C is a topping dispenser in which a plurality of types of toppings (cereal, fruits, and the like) are put. The material supply device 103D is a sauce dispenser in which a plurality of types of fruit sauces are put.

The product delivery device 104 is a device for delivering topped soft-serve ice cream made by the robot unit 101 to the customer G. Spaces of the housing 102 and the customer G are separated by the polycarbonate plate of the housing 102, so that the robot unit 101 and the customer G do not make contact with each other directly when a product is delivered and received. It is to be noted that details of a configuration of the product delivery device 104 are described later with reference to FIG. 4 to FIG. 8.

The input touch panel 105 has a display monitor and is configured such that information can be input by touching a display screen thereof. An order input screen for receiving input of specification of a product is displayed on the display monitor.

To be more specific, the order input screen is configured such that a container (amount) of the soft-serve ice cream, a type of cream, a topping material, and a type of sauce can be selected on the input touch panel 105 to be input. That is to say, the container (amount) of the soft-serve ice cream, the type of cream, the topping material, and the type of sauce correspond to set information (information that can be specified by the customer G) for one product. The order input information is constituted by combinations of the pieces of set information.

The overall computer system 107 is constituted by the robot controller 107A that controls operations of the robot unit 101 and an external computer 107B. Each of the robot controller 107A and the external computer 107B has an arithmetic device, an input device, and a display device. The robot controller 107A and the external computer 107B are connected to each other so as to transmit and receive a direction and the like.

Furthermore, the input touch panel 105 is connected to the external computer 107B. The external computer 107B has an operation storage portion 108A, a settling processor (settling unit) 108B, a processing selecting portion 108C, a processing operation directing portion 108D, and a product carrying-out directing portion 108E, as functions.

The operation storage portion 108A is a storage that stores therein at least equal to or more than one processing operation. The processing operation is stored as teaching data indicating an operation mode of the robot unit 101 for each type of the processing operation.

The settling processor 108B executes settling processing of permitting the robot unit 101 to perform an operation if a predetermined amount of money is put into the money charger 106 or input of predetermined settlement information is received on the input touch panel 105.

If the settling processing has been completed, the processing selecting portion 108C selects a processing operation suitable to order input information from the processing operations stored in the operation storage portion 108A based on the order input information input to the input touch panel 105. The processing operation directing portion 108D generates a direction to the robot controller 107A in accordance with the processing operation selected by the processing selecting portion 108C.

The robot controller 107A operates the robot unit 101 in accordance with the direction so as to perform preparation processing with materials in the material supply devices 103A to 103D as will be described later. If it is determined that the direction by the processing operation directing portion 108D has been completed and the processing operation by the robot unit 101 has been completed, the product carrying-out directing portion 108E supplies a product (in the embodiment, soft-serve ice cream) on which the preparation processing has been performed to the customer G through the product delivery device 104.

The service providing system 100 according to the embodiment is configured as described above and operates in the following manner. The robot unit 101 does not start an operation of making a product and stands by until the customer G puts money into the money charger 106. After the money charger 106 has detected that the money has been put into, the input touch panel 105 displays the order input screen (types of container, soft-serve ice cream, topping and sauce, and the like).

If the customer G has finished selecting the specification of the product, such as the topping, through the input touch panel 105, the robot unit 101 takes materials to start the preparation processing operation of making soft-serve ice cream. In the embodiment, an example of the procedure is described by using a case in which a dessert cone has been selected as the container, vanilla has been selected as the type of the soft-serve ice cream, cereal has been selected as the topping, and strawberry has been selected as the sauce, as an example.

The external computer 107B transmits a direction to the robot controller 107A in accordance with the order input information set by the input touch panel 105 and the robot controller 107A transmits a direction to the robot unit 101 to start an operation.

The robot unit 101 detects a bottom surface of the dessert cone (hereinafter, referred to as cone) staked in the material supply device 103A by sensors (not illustrated) provided on the right and left hands 11 and 12. Then, the robot unit 101 recognizes a position distanced from the bottom surface of the cone by a constant amount as a cone gripping position so as to perform a gripping operation.

After the robot unit 101 has gripped the cone, the robot unit 101 lifts the cone and revolves the body portion 2 while moving the right second arm 3R and the left first arm 3L of the robot unit 101 such that the gripped cone is not interfered with the housing 102 and the material supply devices 103A to 103D so as to direct to the material supply device 103B.

Next, the robot controller 107A recognizes that the robot unit 101 has directed to the vanilla-flavored soft-serve ice cream server of the material supply device 103B. Thereafter, the robot controller 107A causes the robot unit 101 to execute an operation of making a ring-shaped engagement portion (not illustrated) provided on a hand that does not grip the cone (for example, the cone is gripped in the left hand 12 and a lever is operated with the right hand 11) engage with the lever (hereinafter, referred to as soft-serve ice cream lever) provided on the soft-serve ice cream server. In other words, the robot controller 107A causes the robot unit 101 to execute an operation of making the lever insert through the engagement portion.

After the soft-serve ice cream lever has been inserted through the ring-shaped engagement portion of the right hand 11, the robot unit 101 performs an operation of lowering the soft-serve ice cream lever to extract the soft-serve ice cream, and adjusts the shape of the soft-serve ice cream with an operation with the left hand 12.

If a constant amount of the soft-serve ice cream has been determined to be extracted, the soft-serve ice cream lever is pressed up with the right hand 11 to stop the extraction of the soft-serve ice cream. If the soft-serve ice cream lever is pressed up to a position at which the soft-serve ice cream is not extracted, the ring-shape engagement portion of the right hand 11 is disengaged from the soft-serve ice cream lever and the body portion 2 is revolved to be directed to the material supply device 103C.

Next, the robot controller 107A recognizes that the robot unit 101 has directed to the material supply device 103C for cereal. Thereafter, the robot controller 107A causes the robot unit 101 to move the soft-serve ice cream gripped in the left hand 12 to the topping discharge portion of the topping dispenser, and turn dial of the topping dispenser with the right hand 11 so as to discharge a constant amount of the content in the topping dispenser (in the embodiment, cereal) and sprinkle the cereal on top of the soft-serve ice cream.

If the constant amount of topping has been discharged, the right hand 11 is removed from the topping dispenser and the robot unit 101 directs to the material supply device 103D while operating both the arms such that the soft-serve ice cream gripped in the right hand 11 and the left hand 12 is not interfered with the housing 102 and the material supply devices 103A to 103D.

Next, the robot controller 107A recognizes that the robot unit 101 has directed to the material supply device (strawberry-flavored sauce dispenser) 103D. Thereafter, the robot controller 107A causes the robot unit 101 to move the soft-serve ice cream gripped in the left hand 12 to a sauce extraction position of the sauce dispenser, grip the sauce dispenser 103D with the right hand 11, and move the sauce dispenser 103D above the sauce extraction position so as to sprinkle a constant amount of strawberry-flavored sauce on top of the soft-serve ice cream. If the sauce has been sprinkled on top of the soft-serve ice cream, the sauce dispenser 103D gripped in the right hand 11 is returned to an original position.

With these processes, the preparation processing operation of the soft-serve ice cream as the product is finished. Thereafter, the robot unit 101 directs to the direction of the product delivery device 104 while operating both the arms such that the soft-serve ice cream gripped in the right hand 11 and the left hand 12 is not interfered with the housing 102 and the material supply devices 103A to 103D.

Next, the robot controller 107A recognizes that the robot unit 101 has directed to the product delivery device 104.

Thereafter, the robot controller 107A causes the robot unit 101 to set the soft-serve ice cream gripped in the left hand 12 to a placement table 83 (see FIG. 5) provided in the product delivery device 104 and to perform an operation of providing the soft-serve ice cream to the customer G with the right hand 11. It is to be noted that details of the operations of the right hand 11 and the product delivery device 104 will be described later with reference to FIG. 9 to FIG. 15.

Next, the robot controller 107A determines that the soft-serve ice cream has been provided to the customer G (for example, the customer G has operated to input reception of the soft-serve ice cream on the input touch panel 105). Thereafter, the overall computer system 107 moves the right arm to a standby posture such that the right hand 11 is not interfered with the housing 102 and the like and waits for money to be put into the money charger 106 subsequently.

In this manner, with the service providing system 100 according to the embodiment, the customer G can purchase a product with the combination that has been selected by himself (herself) only by putting money into the money charger 106 and operating a selection screen that is displayed on the input touch panel 105 without another person (for example, staff of the store). In the example, the combination that has been selected by himself (herself) indicates the dessert cone as the container, the vanilla as the type of the soft-serve ice cream, the cereal as the topping, and the strawberry as the sauce. In addition, the customer G can view the process in which the product is assembled (completely made) as preparation demonstration in a restaurant so as to improve the appealing degree to the customer G.

Furthermore, if the operation mode (teaching data) of the robot unit 101 for establishing the processing operation is set to be in the image of an operation of a skilled cook of soft-serve ice cream, the preparation processing that further resembles the operation by the skilled cook of soft-serve ice cream can be replicated with high accuracy. This makes it possible to improve the worth of the product to be provided.

It is to be noted that although an air chuck, a servo gripper, and the like can be considered as the method of gripping the cone with the left hand 12, the method is not limited thereto. Furthermore, the ring is used as the methods of operating the soft-serve ice cream lever with the right hand 11 and operating the delivering and receiving portion. However, the air chuck and the servo gripper may be used as another method.

Furthermore, a method of gripping the sauce dispenser 103D and a method of extracting only a constant amount of sauce are not described clearly. However, the methods are not limited as long as only the constant amount of sauce can be extracted. In addition, in the embodiment, the cone, the soft-serve ice cream, the topping, and the sauce are combined in this order. However, the order of the topping and the sauce may be inversed and a plurality of types of toppings and sauces may be combined.

Product Delivery Device

Next, details of the product delivery device 104 according to the first embodiment are described with reference to FIG. 4 to FIG. 8. As illustrated in FIG. 4 to FIG. 8, the product delivery device 104 is configured by including a customer-side door (outer-side partitioning member) 61, spring hinges 62, a customer-side sensor plate 63, a customer-side key (opening/closing adjusting unit) 64A, a customer-side key (opening/closing adjusting unit) 64B, a customer-side sensor 65, a delivery and reception counter (movement member) 66, a cam 67, a fixing-side pin 68, a delivery and reception counter-side pin 69, a soft-serve ice cream sensor 70, a customer-side key spring 71, a ceiling plate (communicating member) 72, a right side plate (communicating member) 73R, a left side plate (communicating member) 73L, a right column (communicating member) 74R, a left column (communicating member) 74L, a robot-side door (robot-side partitioning member) 75, a robot-side key (opening/closing adjusting unit) 76A, a robot-side key (opening/closing adjusting unit) 76B, a robot-side sensor plate 77, a robot-side sensor 78, a lever (movement mechanism) 79, a delivery and reception counter spring (movement mechanism) 80, guides (movement mechanisms) 81, a pedestal 82, and a placement table 83.

In the embodiment, a front wall portion of the housing 102 corresponds to the partitioning member. The communicating member partitioned by the customer-side door 61, the ceiling plate 72, the right side plate 73R, the left side plate 73L, the robot-side door 75, the right column 74R, the left column 74L, and the pedestal 82 is formed on an opening provided on the housing 102. The inner side (robot-side) and the outer side of the housing 102 can communicate with each other through the communicating member.

A pair of guides 81 extending in the inner-outer direction of the housing 102 are installed on the pedestal 82 so as to be opposed to each other. The delivery and reception counter 66 and the lever 79 are arranged on the pair of guides 81 so as to be movable along the guides 81 in a sliding manner.

The delivery and reception counter spring 80 as a buffering member is provided between the delivery and reception counter 66 and the lever 79 in substantially the same direction as the extending direction of the guides 81. The placement table 83 is provided on a front end portion of the delivery and reception counter spring 80. That is to say, a contact force between the delivery and reception counter 66 and the lever 79 is transmitted through the delivery and reception counter spring 80.

The placement table 83 having a shape that is appropriate to soft-serve ice cream W to be placed is provided on the delivery and reception counter 66. The soft-serve ice cream sensor 70 that detects whether the soft-serve ice cream W is placed is attached to the placement table 83.

Figure 8:
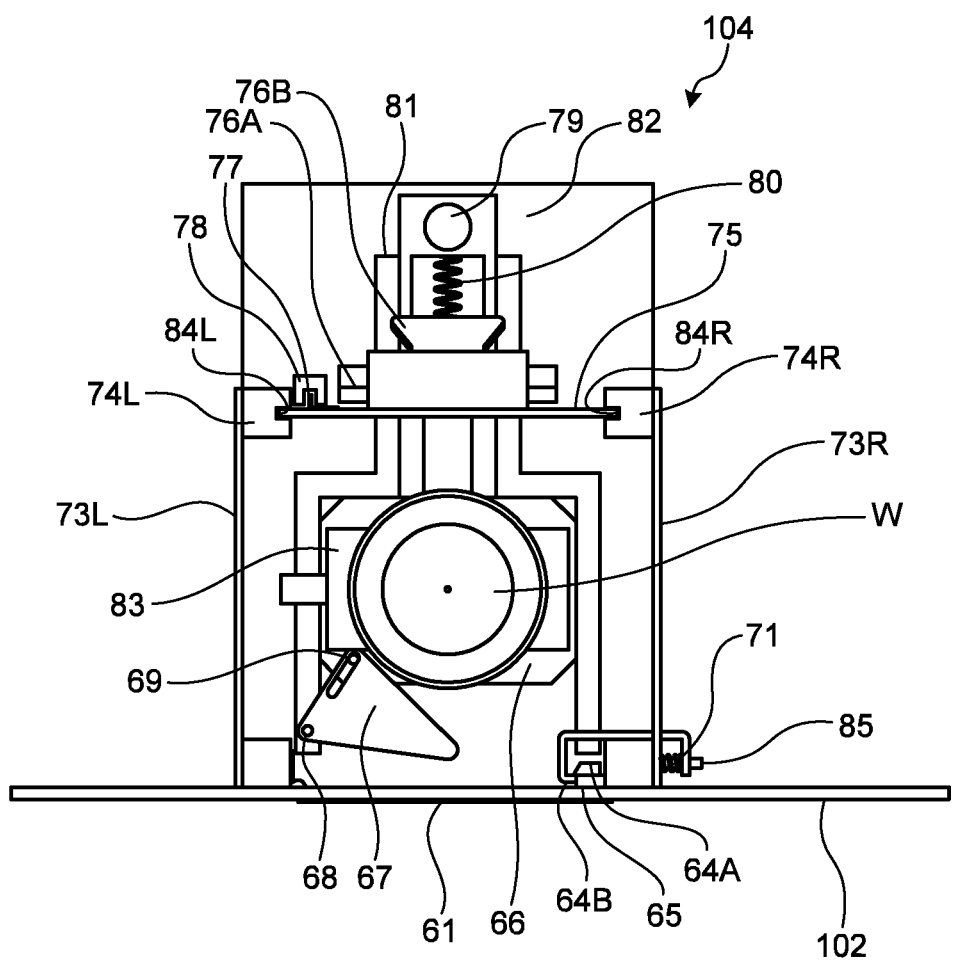
FIG. 8 is a schematic top view for explaining the product delivery device according to the first embodiment.

In particular, as illustrated in FIG. 8, the robot-side door 75 can move in the up-down direction in the sliding manner along a groove 84R and a groove 84L provided on the right column 74R and the left column 74L, respectively. That is to say, in the embodiment, a first opening/closing mechanism is formed by the groove 84R and the groove 84L.

Figure 5:
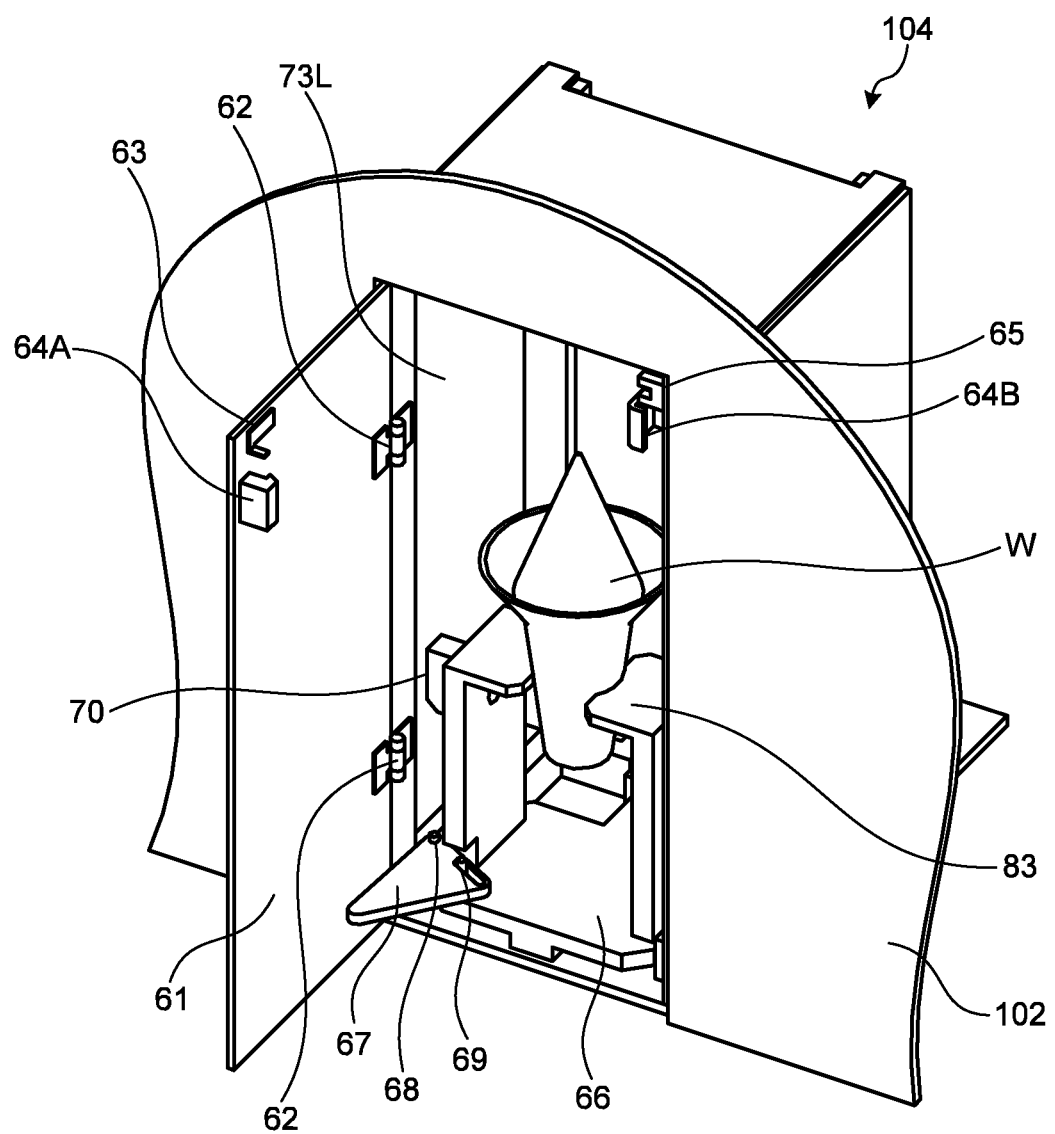
FIG. 5 is a schematic perspective view for explaining the product delivery device according to the first embodiment.
Figure 6:
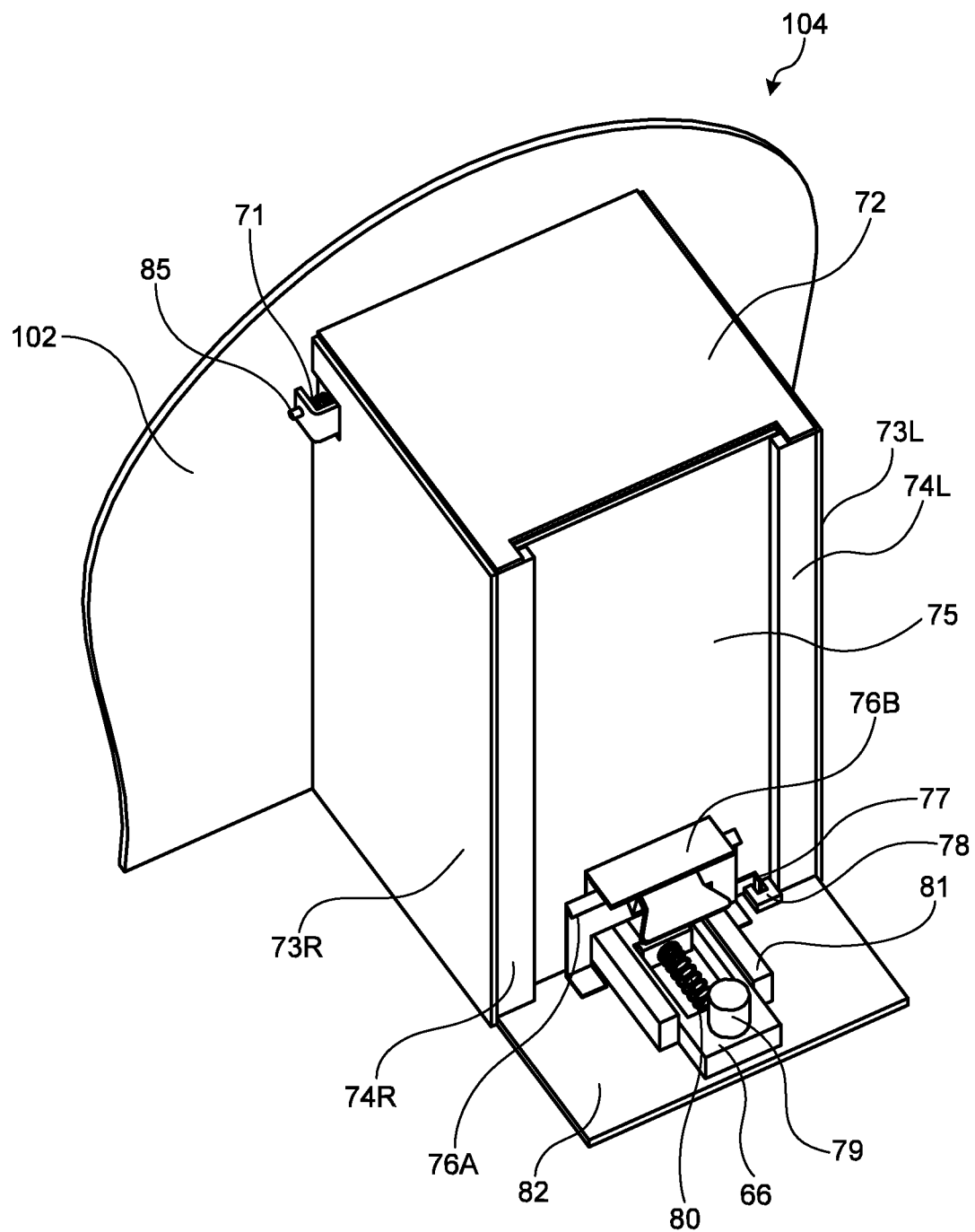
FIG. 6 is a schematic perspective view for explaining the product delivery device according to the first embodiment.

As illustrated in FIG. 5, the customer-side door 61 is attached to the left side plate 73L with the spring hinges 62 and 62 attached to the upper and lower portions thereof and can be operated to be opened and closed while the spring hinges 62 and 62 function as hinges. That is to say, in the embodiment, a part of the opening/closing adjusting unit is formed by the customer-side door 61 and the spring hinges 62 and 62. Furthermore, the spring hinges 62 and 62 are biased in the direction that the customer-side door 61 is closed all the time with incorporated springs.

Furthermore, the customer-side key 64A is attached to the customer-side door 61 and the customer-side key 64B is provided on the right side plate 73R. When the customer-side door 61 is in a full-closed state, the customer-side keys 64A and 64B are engaged with each other so as to prohibit the opening/closing operations of the customer-side door 61.

Furthermore, the customer-side sensor plate 63 is attached to the customer-side door 61 and the customer-side sensor 65 is provided on the right side plate 73R. The customer-side sensor 65 is a sensor that detects whether the customer-side sensor plate 63 makes contact therewith. That is, the customer-side sensor 65 detects whether the customer-side door 61 is in the full-closed state and inputs the detected result to the external controller 107B.

When the customer-side door 61 is in the full-closed state, the customer-side keys 64A and 64B are engaged with each other so as to prohibit the opening/closing operations of the customer-side door 61. Furthermore, as illustrated in FIG. 8, the customer-side key 64B is biased in the direction that the customer-side keys 64A and 64B are engaged with each other with the customer-side key spring 71. The engagement between the customer-side keys 64A and 64B is released by pressing a base end portion 85 of the customer-side key 64B from the inner side of the housing 102.

Figure 7:
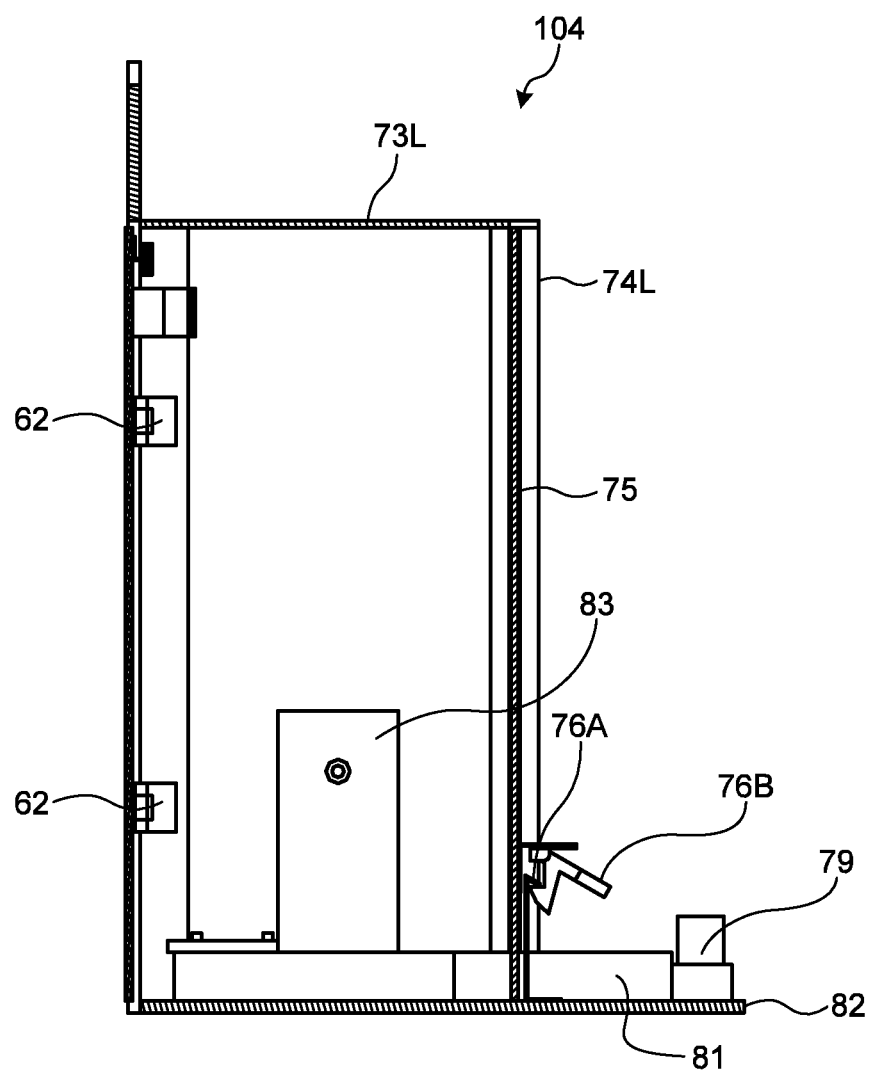
FIG. 7 is a schematic right-side cross-sectional view for explaining the product delivery device according to the first embodiment.

Furthermore, as illustrated in FIG. 7, the robot-side key 76B is attached to the robot-side door 75. In addition, the robot-side key 76A extends upward from the pedestal 82. The engagement portion at the upper end side of the robot-side key 76A and the engagement portion of the robot-side key 76B are engaged with each other so as to restrict (prohibit) the robot-side door 75 from being moved in the sliding manner. That is to say, in the embodiment, a part of the opening/closing adjusting unit is formed by the robot-side keys 76A and 76B.

Normal Delivery and Reception Operation

Figure 9:
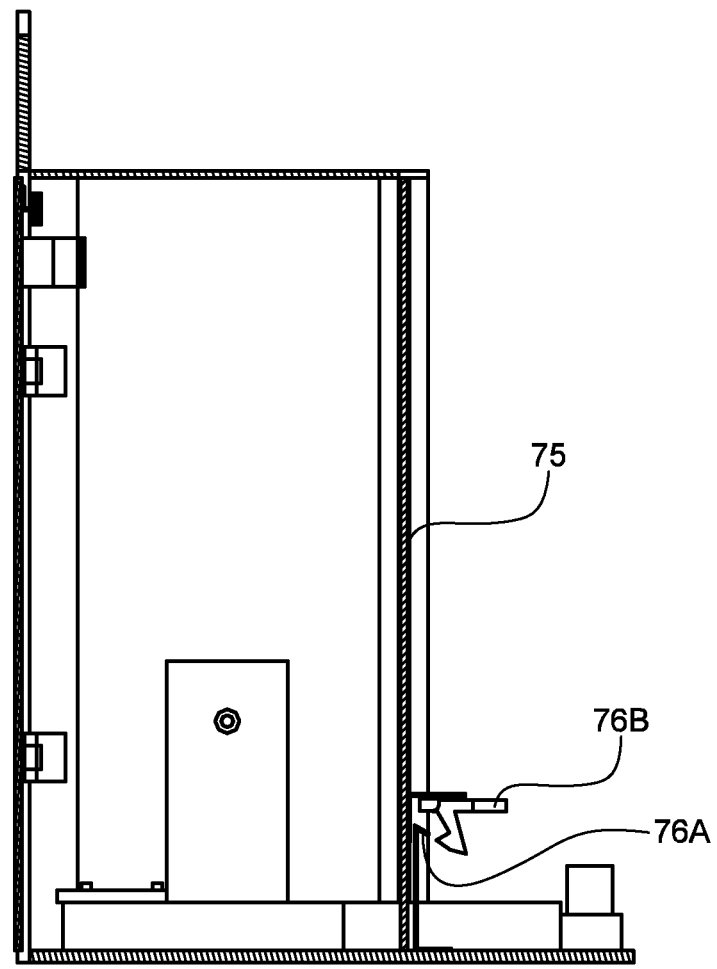
FIG. 9 is a schematic right-side cross-sectional view for explaining the product delivery device according to the first embodiment.

Hereinafter, operations of the product delivery device 104 are described. First, a case where the product (soft-serve ice cream W) is normally delivered and received is described with reference to FIG. 9 to FIG. 14. The procedure with which the robot unit 101 delivers the soft-serve ice cream W is described sequentially with reference to the drawings. If the soft-serve ice cream W has been completed, as illustrated in FIG. 9, the robot-side key 76B is pulled to the front side by one of the right hand 11 and the left hand 12 that does not hold the soft-serve ice cream W. With this, the engagement between the robot-side key 76A and the robot-side key 76B is released and the robot-side door 75 is made into a state of being movable in the up-down direction.

First, it is checked that the customer-side door 61 is closed based on input from the customer-side sensor 65. Then, if the robot unit 101 is operated while gripping the robot-side key 76B with the right hand 11 or the left hand 12 so as to lift the robot-side key 76B, the robot-side door 75 is moved upward because the robot-side key 76B is fixed. With this, the partition between the inner portion of the communicating member and the inner portion of the housing 102 is removed, so that the inner portion of the communicating member and the inner portion of the housing 102 communicate with each other. As described above, in this case, the customer-side door 61 has been checked to be closed, and unauthorized access to the robot side by the customer G and the like from the customer-side door 61 can be prevented.

Figure 10:
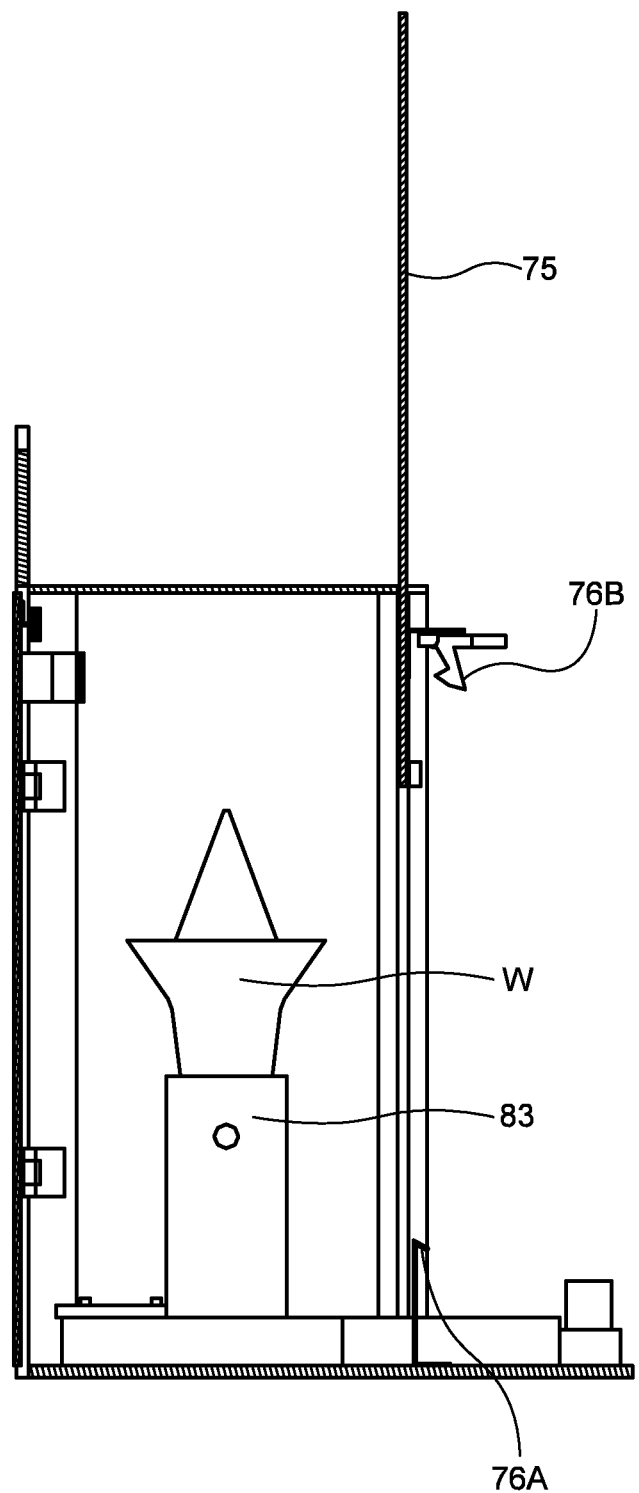
FIG. 10 is a schematic right-side cross-sectional view for explaining the product delivery device according to the first embodiment.

Furthermore, as illustrated in FIG. 10, if the robot unit 101 is operated to open the robot-side door 75 sufficiently by a predetermined amount, the right hand 11 or the left hand 12 is stopped and the robot-side door 75 is kept to be in the opened state.

Then, the right hand 11 or the left hand 12 holding the soft-serve ice cream W is made to enter the communicating member and places the soft-serve ice cream W on the placement table 83 and gripping of the soft-serve ice cream W with the right hand 11 or the left hand 12 is released.

Figure 11:
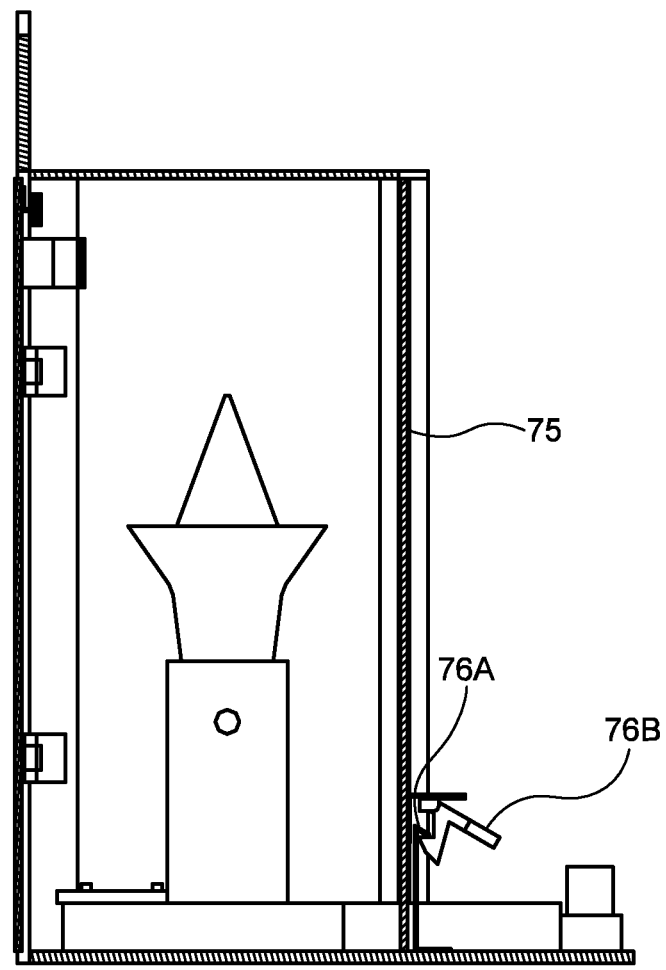
FIG. 11 is a schematic right-side cross-sectional view for explaining the product delivery device according to the first embodiment.

Subsequently, the soft-serve ice cream W is checked to be set on the placement table 83 with the soft-serve ice cream sensor 70. Then, as illustrated in FIG. 11, the robot unit 101 closes the robot-side door 75 by using a gravity force in a state of gripping the robot-side key 76B.

Figure 12:
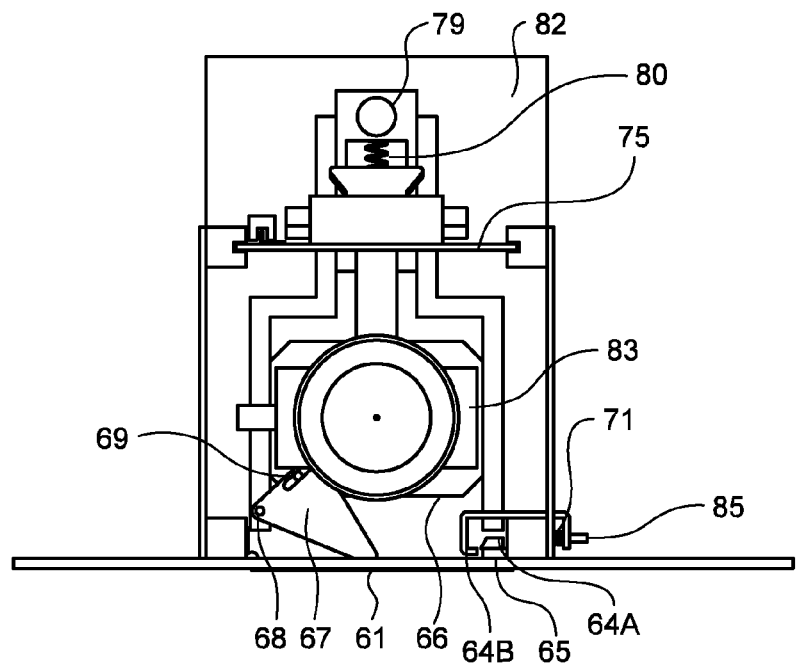
FIG. 12 is a schematic top view for explaining the product delivery device according to the first embodiment.
Figure 13:
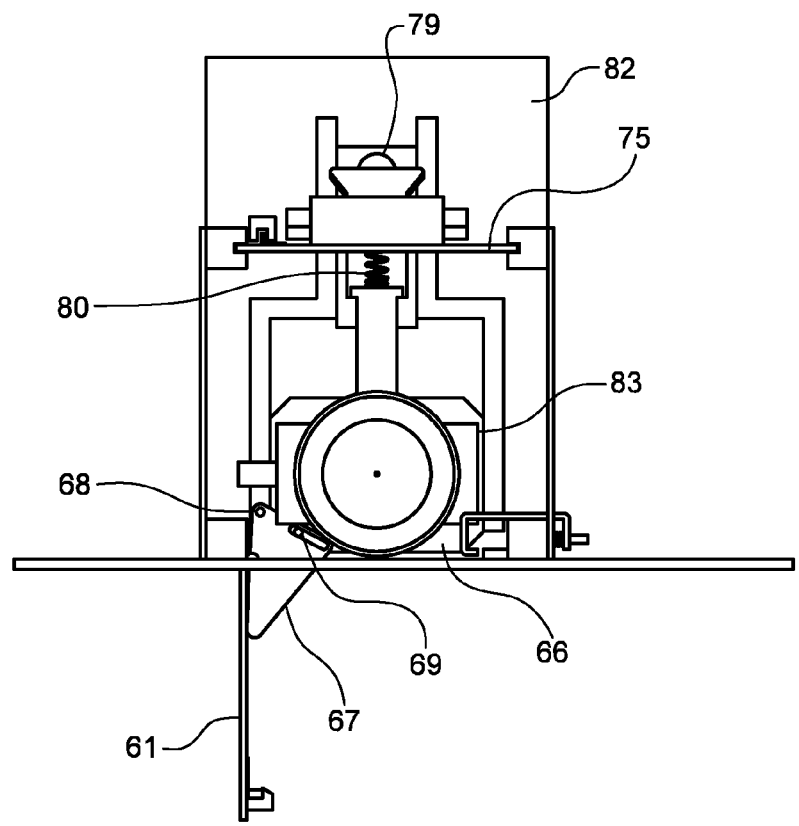
FIG. 13 is a schematic top view for explaining the product delivery device according to the first embodiment.

Thereafter, the robot-side door 75 is checked to be closed with the robot-side sensor 78. Then, as illustrated in FIG. 12 and FIG. 13, the robot unit 101 is operated to press the base end portion 85 of the customer-side key 64B with the left hand 12, so that the engagement between the customer-side keys 64A and 64B is released and the lever 79 is pressed to the outer side of the housing 102 (side of the customer-side door 61) with the right hand 11.

If a force is applied to the lever 79 by the robot unit 101, the lever 79 is moved to the outer side of the housing 102 along the guides 81. A force of the delivery and reception counter spring 80 is transmitted to the customer-side door 61 through the delivery and reception counter 66 and the cam 67, so that the customer-side door 61 is opened. With this, the partition between the outer side of the housing 102 and the inner portion of the communicating member is removed and the customer G can take the soft-serve ice cream W placed on the placement table 83. In this case, since the robot-side door 75 is closed, unauthorized access to the robot side by the customer G and the like from the customer-side door 61 can be prevented.

Figure 14:
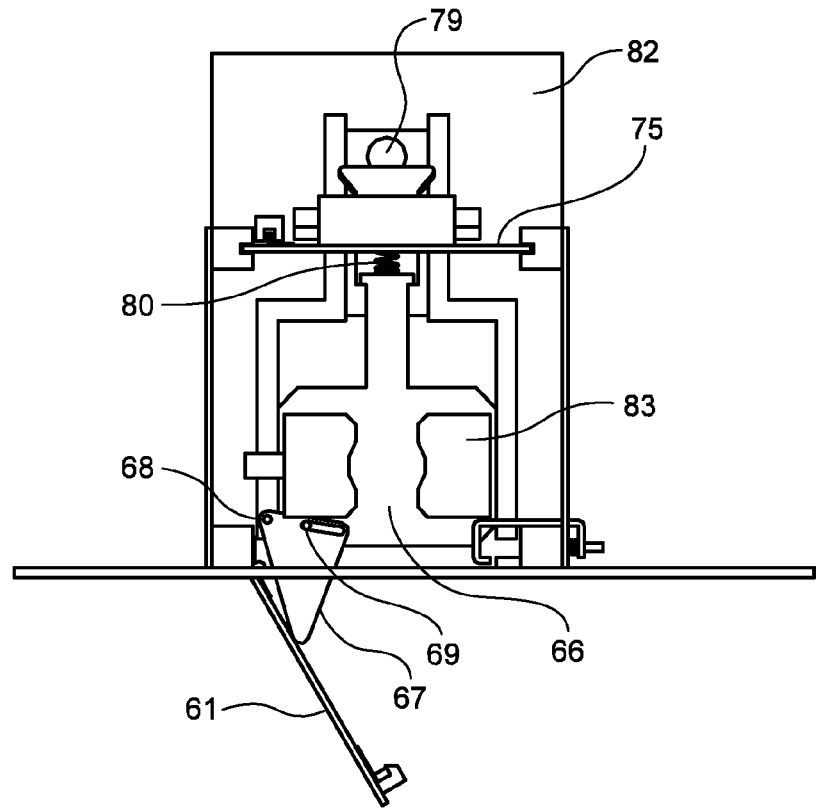
FIG. 14 is a schematic top view for explaining the product delivery device according to the first embodiment.

If the customer G receives the soft-serve ice cream W, as illustrated in FIG. 14, a fact that the customer G receives the soft-serve ice cream W from the placement table 83 is input to the external controller 107B with the input from the soft-serve ice cream sensor 70.

Figure 15:
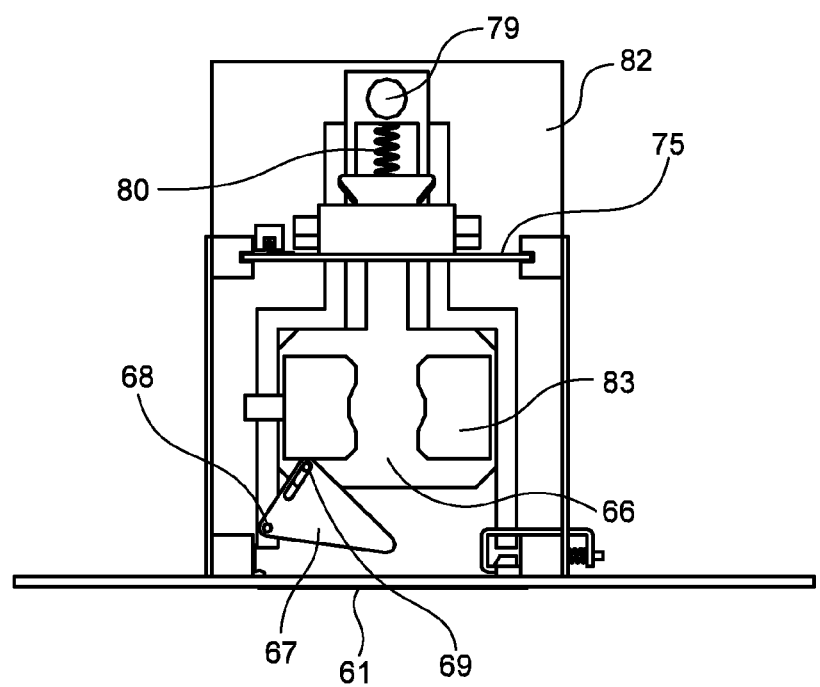
FIG. 15 is a schematic top view for explaining the product delivery device according to the first embodiment.

If the soft-serve ice cream W is checked to be absent on the placement table 83, the robot unit 101 pulls the lever 79 (or makes a force of pressing the lever 79 to the outer side weaker). With this, as illustrated in FIG. 15, the customer-side door 61 is closed with the biasing forces by the spring hinges 62 and the customer-side keys 64A and 64B are engaged with each other.

Abnormal Delivery and Reception

Next, an action of the product delivery device 104 when some trouble is generated at the time of the delivery and reception of the product (soft-serve ice cream W) is described with reference to FIG. 16 to FIG. 18.

Case 1

Figure 16:
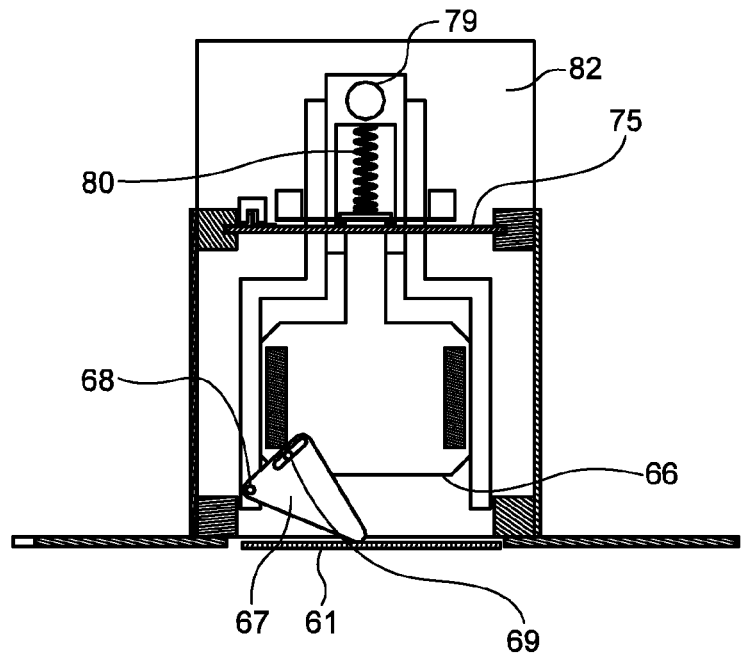
FIG. 16 is a schematic top cross-sectional view for explaining the product delivery device according to the first embodiment.
Figure 17:
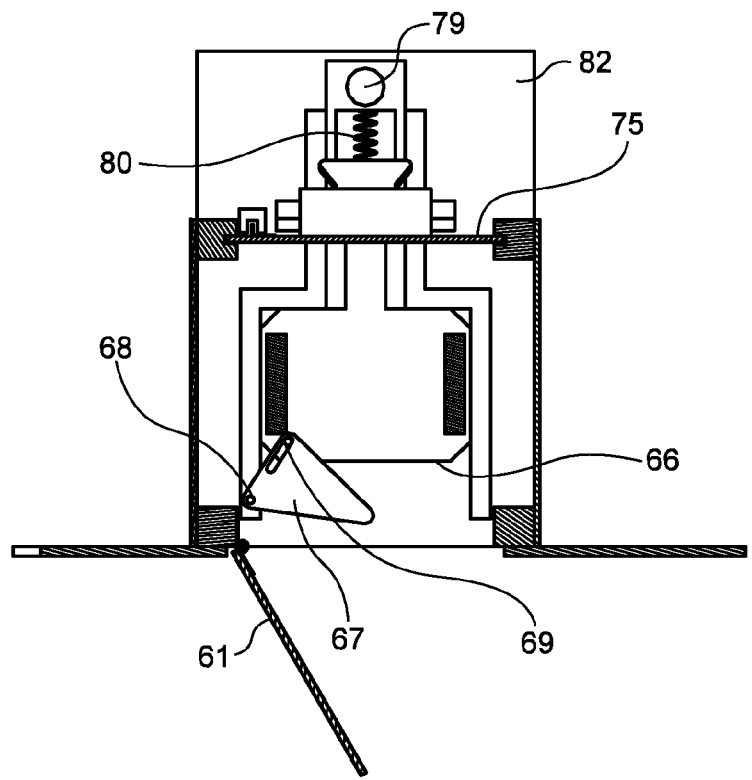
FIG. 17 is a schematic top cross-sectional view for explaining the product delivery device according to the first embodiment.

As illustrated in FIG. 16 and FIG. 17, even if the robot unit 101 pulls the lever 79 for delivering the soft-serve ice cream W in a state where the customer-side door 61 is opened and the customer-side door 61 is not closed because some obstacle is caught, the customer-side door 61 can be kept to be in the opened state since the cam 67 and the delivery and reception counter 66, and the customer-side door 61 are independently operated.

Accordingly, influence on the side of the customer G is suppressed to the minimum limit and the customer-side door 61, the delivery and reception counter 66, and the robot unit 101 are not broken. In addition, the customer-side door 61 is configured to be closed by the spring hinges 62. Therefore, if a reason why the customer-side door 61 is not closed is eliminated, the operation returns to the normal system.

Case 2

Figure 18:
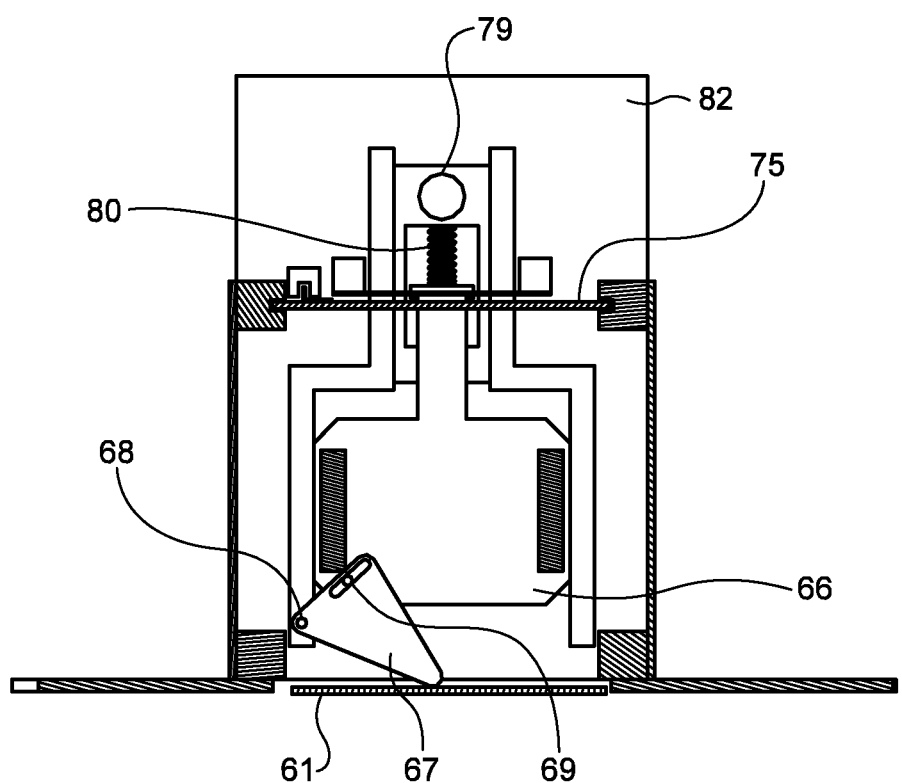
FIG. 18 is a schematic top cross-sectional view for explaining the product delivery device according to the first embodiment.

As illustrated in FIG. 18, even when the robot unit 101 presses the lever 79 for the delivery and reception operation of the soft-serve ice cream W in a state where the customer-side door 61 is not opened for some reason, for example, when the customer-side door 61 is pressed from the outer side, the delivery and reception counter spring 80 is contracted, so that the force of the pressing operation of the lever 79 is absorbed. Accordingly, the influence on the side of the customer G is suppressed to the minimum limit and damage on the customer-side door 61, the delivery and reception counter 66, the robot unit 101, and the like are prevented or reduced.

In this manner, with the service providing system 100 according to the embodiment, when the product (in the example, soft-serve ice cream W) is delivered to and received by the customer G, the process in which the product is delivered and received with the operation by the robot unit 101 can be viewed while preventing incorrect access to the inner portion of the housing 102 through the product delivery device 104. Therefore, for example, the product can be delivered and received without giving cold image to the customer G unlike the vending machine. Moreover, there is also an advantage that a driving force for conveyance such as a conveying conveyor is not required to be provided for the product delivery device 104.

Second Embodiment

Subsequently, the second embodiment is described. In the embodiment, a robot decoration system is described as an example of the service providing system. In the robot decoration system, decoration processing of bonding decorative materials such as glass particles to a hand mirror (product, base material) as a product in accordance with an arrangement design that has been ordered (selected) is performed and the obtained product is provided to a customer. Description of constituent components having the same configurations as those in the above-described first embodiment is omitted and the same reference numerals denote the constituent components.

Figure 19:
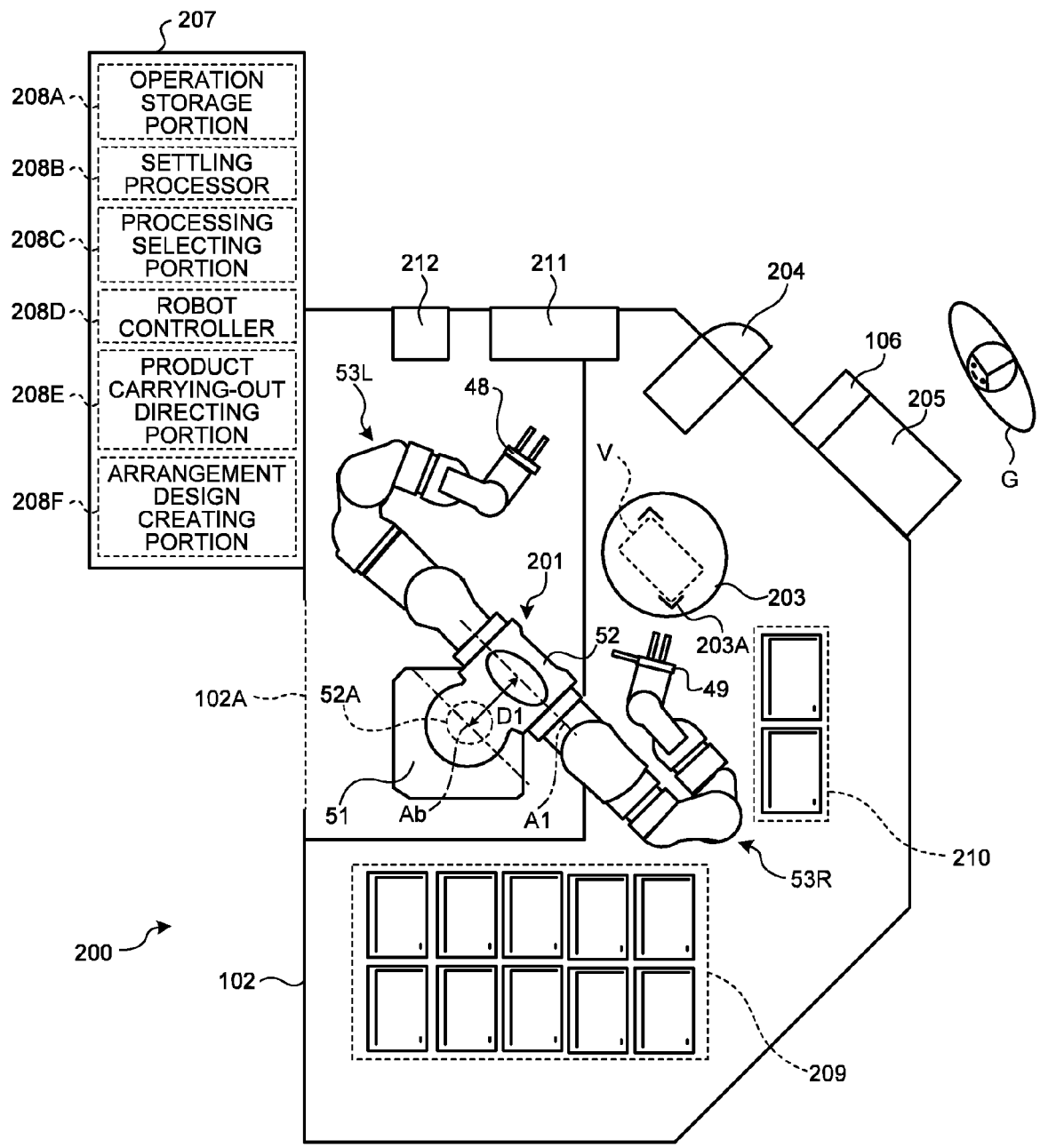
FIG. 19 is a schematic top view for explaining a service providing system according to a second embodiment.

As illustrated in FIG. 19, a service providing system 200 according to the embodiment is configured by including a robot unit 201, the housing 102, an operation stage 203, a product delivery device 204, an input touch panel (interface, settling unit) 205, the money charger (settling unit) 106, an overall computer system 207, a decorative material accommodating area (small member accommodating portion) 209, a decorative material placement site for operation 210, a hand mirror accommodating shelf (base material accommodating portion) 211, and an adhesive gun placement site (adhesive supply tool accommodating portion) 212.

The robot unit 201 has substantially the same configuration as the robot unit 101 according to the first embodiment. As detail configurations thereof are described again, on the robot unit 201, a foundation 51 is fixed to an installation surface with an anchor bolt (not illustrated), a body portion 52 is provided on the foundation 51 in such a manner that the body portion 52 can revolve about a rotating shaft Ab of an actuator 52A with respect to the foundation 51 through the actuator 52A, and a first arm 53L and a second arm 53R are provided on the body portion 52 at right and left sides, in the same manner as the robot unit 101 according to the first embodiment.

It is to be noted that a shape of the body portion 52 is set in such a manner that the body portion 52 is shifted to the front side with respect to the foundation 51 in the horizontal direction. The body portion 52 is shifted to the front side such that the rotating shaft Ab of the actuator 52A and a rotating shaft A1 of first actuators of the first arm 53L and the second arm 53R are deviated from each other in the direction horizontal to the installation surface by a length D1.

Figure 20:
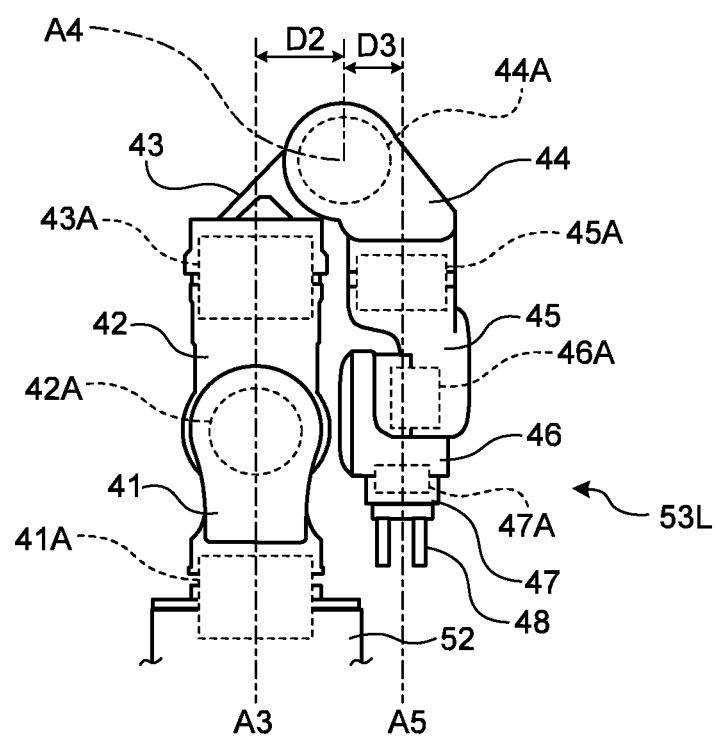
FIG. 20 is a schematic view for explaining main parts of a robot unit according to the second embodiment.

As illustrated in FIG. 20, the first arm 53L is configured by coupling a first structural material 41, a second structural material 42, a third structural material 43, a fourth structural material 44, a fifth structural material 45, a sixth structural material 46, and a flange 47 in this order from the side of the body portion 52 to the front end through actuators (rotating joints) each of which is driven rotationally.

The body portion 52 and the first structural material 41 are coupled to each other through a first actuator (first joint) 41A. If the first actuator 41A is driven, the first structural material 41 is rotated. The first structural material 41 and the second structural material 42 are coupled to each other through a second actuator (second joint) 42A. If the second actuator 42A is driven, the second structural material 42 is revolved.

The second structural material 42 and the third structural material 43 are coupled to each other through a third actuator (third joint) 43A. If the third actuator 43A is driven, the third structural material 43 is rotated. The third structural material 43 and the fourth structural material 44 are coupled to each other through a fourth actuator (fourth joint) 44A. If the fourth actuator 44A is driven, the fourth structural material 44 is revolved.

The fourth structural material 44 and the fifth structural material 45 are coupled to each other through a fifth actuator (fifth joint) 45A. If the fifth actuator 45A is driven, the fifth structural material 45 is rotated. The fifth structural material 45 and the sixth structural material 46 are coupled to each other through a sixth actuator (sixth joint) 46A. If the sixth actuator 46A is driven, the sixth structural material 46 is revolved.

The sixth structural material 46 and the flange 47 are coupled to each other through a seventh actuator (seventh joint) 47A. If the seventh actuator 47A is driven, the flange 47 is rotated.

A left hand 48 of which space between a pair of finger members can be expanded and contracted by driving an actuator (not illustrated) is provided on the flange 47. The shape of the third structural material 43 is set such that a rotating shaft A3 of the third actuator 43A and a rotating shaft A4 of the fourth actuator 44A are deviated from each other by a length D2 when seen from the above.

Furthermore, the shape of the fourth structural material 44 is set such that the rotating shaft A4 of the fourth actuator 44A and a rotating shaft A5 of the fifth actuator 45A are deviated from each other by a length D3 when seen from the above. Shapes of the structural materials are set such that when the first arm 53L is bent with rotational movement of the fourth actuator 44A and the second structural material 42 and the fifth structural material 45 are aligned, the rotating shaft A3 of the third actuator 43A and the rotating shaft A5 of the fifth actuator 45A are deviated from each other by a length (D2+D3). Furthermore, an operation region of the robot unit 201 in the vicinity of the foundation 51 and the body portion 52 is ensured while suppressing the second to fifth structural materials 42 to 45 from being interfered with one another when bending the fourth actuator 44A.

The second arm 53R has the same configuration as the above-described first arm 53L, and the second arm 53R is arranged such that the installation direction thereof on the body portion 52 is deviated from that of the first arm 53L by 180 degrees. A right hand 49 is attached to the second arm 53R. The right hand 49 has a pair of finger members and a suction device. The finger members are expanded and contracted in the same manner as the left hand 48. The suction device is provided on a front end of the right hand 49 so as to adsorb the decorative materials from a decorative material cassette, which will be described later, one by one.

The operation stage 203 has a substantially horizontal operation surface and position restricting tools 203A for positioning. If a hand mirror V is made to abut against the position restricting tools 203A, the hand mirror V is positioned and placed at a position that has been stored in the overall computer system 207 previously.

The product delivery device 204 is a device for delivering the hand mirror V on which the decoration processing has been performed by the robot unit 201 to the customer G. Spaces of the product delivery device 204 and the customer G are separated by a polycarbonate plate. It is to be noted that the product delivery device 204 is locked normally and a delivery and reception operation is performed by the robot unit 201 on the product delivery device 204 when the product is delivered and received. The product delivery device 204 is configured such that the robot unit 201 and the customer G do not make contact with each other directly.

The input touch panel 205 has a display monitor and is connected to the overall computer system 207 such that information can be communicated therebetween. Furthermore, the customer G can input information to the overall computer system 207 by touching the display monitor.

Furthermore, a data reading device (input port) that can read data of an arrangement design of the decorative materials is provided on the input touch panel 205 so as to receive the arrangement design data prepared by the customer G. It is to be noted that the reading device may be a reading device that reads electronic data from a recording medium most simply. Furthermore, the reading device may have a design input function of digitalizing information of a design that is drawn by the customer G at that site.

An order input screen for receiving input of the specification of the product is displayed on the display monitor of the input touch panel 205. To be more specific, a hand mirror selection screen on which a plurality of types of hand mirrors V are displayed and a desired type is made to be selected is displayed on the order input screen.

Furthermore, a custom/original selection screen for selecting whether a custom arrangement design stored in the overall computer system 207 previously is selected or an original arrangement design of the customer G is input from the data reading device is displayed.

If the custom arrangement design is selected on the custom/original selection screen, an arrangement design selection screen on which a plurality of types of arrangement designs corresponding the selected hand mirror V are displayed and a desired type of arrangement design is made to be selected is displayed.

If the arrangement design data of the original arrangement design is input, an arrangement design creating portion 208F of the overall computer system 207 creates arrangement coordinate data of the decorative materials based on the input arrangement design data. In this case, it is determined whether the processing operation can be performed by the robot unit 201 on the arrangement design creating portion 208F. For example, it is determined whether the selected type of hand mirror V and the input arrangement design data is unmatched. If it has been determined that the input arrangement design data is data on which the processing operation cannot be performed, the fact is displayed on the display monitor and the previous custom/original selection screen is displayed again.

Figure 21:
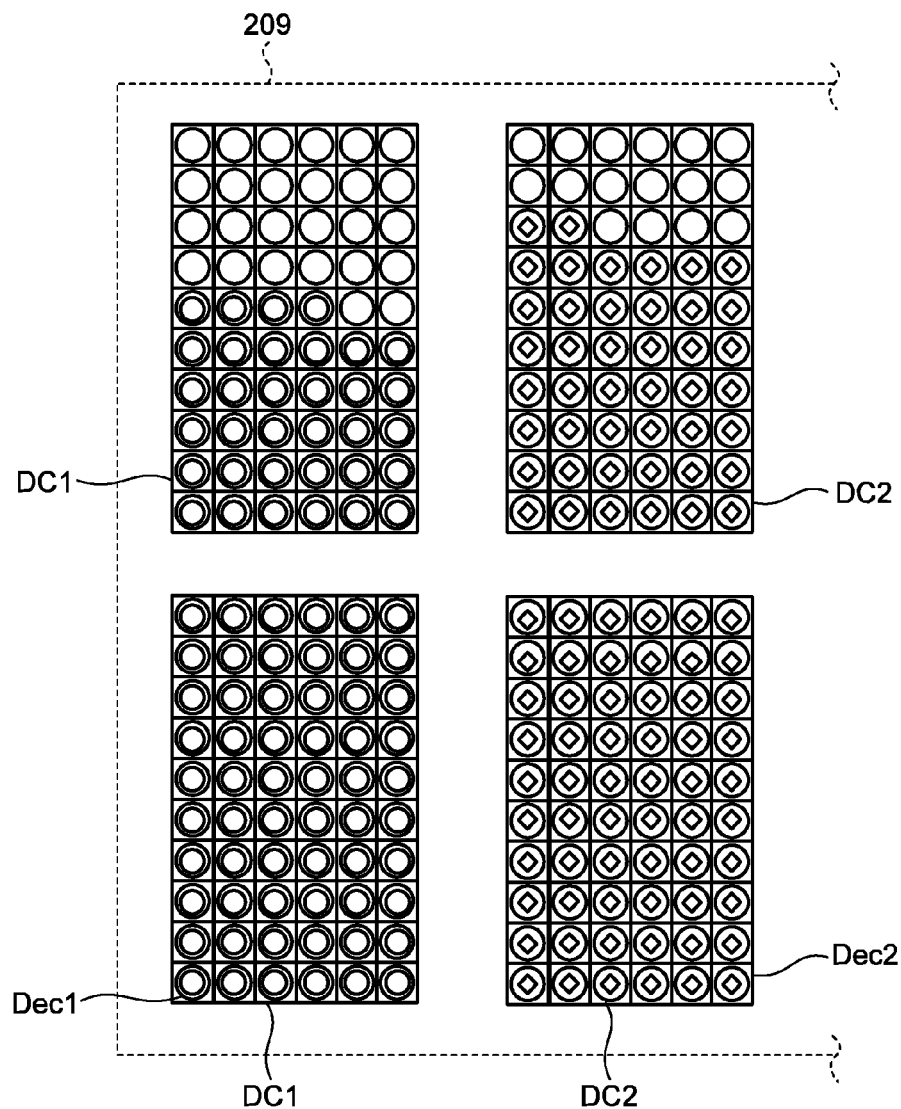
FIG. 21 is a schematic top view for explaining a small member accommodating portion according to the second embodiment.

The decorative material accommodating area 209 is provided in the vicinity of the second arm 53R of the robot unit 201. As illustrated in FIG. 21, a plurality of material cassettes DC1 and DC2 that have a plurality of small accommodating chambers aligned in a matrix form are positioned and placed on the decorative material accommodating area 209. Decorative materials Dec1, Dec2 are accommodated in the small accommodating chambers of the decorative material cassettes DC1 and DC2 one by one, respectively. It is to be noted that sizes and positions of the respective small accommodating chambers of the decorative material cassettes DC1 and DC2 or information of sizes of various types of decorative materials have been stored in the overall computer system 207 previously.

The decorative materials Dec1 of the same type are accommodated in the decorative material cassette DC1. Two decorative material cassettes DC1 and two decorative material cassettes DC2 in which the decorative materials of the same types are accommodated are placed on the decorative material accommodating area 209. The decorative materials are prevented from being shortage during an operation on the single hand mirror V by arranging the two decorative material cassettes DC1 and the two decorative material cassettes DC2 of the same types. In FIG. 21, only two types of decorative materials and decorative material cassettes DC1 and DC2 are illustrated. However, the number and the types of the decorative materials can be set appropriately in accordance with types of rhinestones and the like as the decorative materials.

The decorative material placement site for operation 210 is provided at a position closer to the operation stage 203 with respect to the decorative material accommodating area 209 and can be formed such that the two decorative material cassettes DC1 and DC2 can be positioned and placed thereon.

The plurality of types of hand mirrors V to be products are accommodated in the hand mirror accommodating shelf 211 and the types and the accommodating positions of the hand mirrors V have been stored in the overall computer system 207 previously. An adhesive gun (not illustrated) that supplies an adhesive is placed on the adhesive gun placement site 212. The adhesive gun can be held in the left hand 48 and can be operated to start and stop the supply of the adhesive from a tip thereof with the operation with the left hand 48.

In the embodiment, the control system including the robot controller is configured by the overall computer system 207 as an integrated arithmetic device as a configuration example of a control unit unlikely in the first embodiment. However, in the embodiment, the control device may be also configured by an arithmetic device group of separated members that share functions likely in the first embodiment.

The overall computer system 207 includes an operation storage portion 208A, a settling processor (settling unit) 208B, a processing selecting portion 208C, a robot controller 208D, a product carrying-out directing portion 208E, and an arrangement design creating portion 208F, as functions.

An operation procedure of the processing operation on the hand mirror V is stored in the operation storage portion 208A for each selected hand mirror V and each arrangement design corresponding to the selected hand mirror V. The processing operation is stored as teaching data indicating an operation mode of the robot unit 201. Types of decorative materials to be used for the arrangement design and arrangement position (positional coordinate) information of the various types of decorative materials on the hand mirror V are included in the teaching data.

The settling processor 208B executes settling processing of permitting the robot unit 201 to perform an operation if a predetermined amount of money is put into the money charger 106 or input of predetermined settlement information is received on the input touch panel 205.

If the settling processing by the setting processor 208B has been completed, the processing selecting portion 208C selects a processing operation suitable to order input information from the processing operations stored in the operation storage portion 208A based on the order input information input to the input touch panel 205. The processing operation directing portion 208D generates an operation direction to the actuators of the robot unit 201 in accordance with the processing operation selected by the processing selecting portion 208C and operates the robot unit 201.

If it is determined that the processing operation by the robot unit 201 has been completed, the product carrying-out directing portion 208E places the product (in the embodiment, hand mirror V) on which the decoration processing has been performed on the product delivery device 204.

The arrangement design creating portion 208F creates arrangement coordinate data of the decorative materials based on the arrangement design data input from the data reading device as described above. It is to be noted that pieces of arrangement interval information relating to all types of decorative materials have been stored in the overall computer system 207 previously and the arrangement design creating portion 208F creates the arrangement coordinate data of the decorative materials by replacing the arrangement design data by arrangement coordinates of the types of decorative materials.

The service providing system 200 according to the embodiment is configured as described above and operates in the following manner. The robot unit 201 stands by until the customer G puts money into the money charger 106. If the money charger 106 detects that the money has been put into, the input touch panel 205 displays the order input screen (hand mirror selection screen, custom/original selection screen, arrangement design selection screen, and the like).

If the customer G has finished selecting the specification of the product through the input touch panel 205, a processing operation is selected by the processing selecting portion 208C and a corresponding operation procedure is selected from a plurality of operation procedures of the processing operations stored in the operation storage portion 208A.

Figure 22:
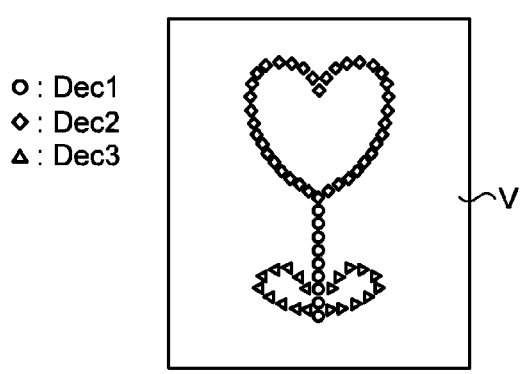
FIG. 22 is a schematic top view for explaining an example of an arrangement design according to the second embodiment.

The operation procedure is described by using a case in which an arrangement design as illustrated in FIG. 22 has been selected, as an example. The first arm 53L operates to grip the selected type of hand mirror V with the left hand 48, takes the hand mirror V from the hand mirror accommodating shelf 211, makes the hand mirror V abut against the gripped position restricting tools 203A on the operation stage 203, and places the hand mirror V on the operation stage 203 in a state where the hand mirror V is positioned, based on an operation direction from the robot controller 208D.

If the hand mirror V is placed on the operation stage 203, the first arm 53L moves to the adhesive gun placement site 212, grips the adhesive gun with the left hand 48, and stops at a standby position in the vicinity of the operation stage 203.

The second arm 53R operates in parallel with the operation of the first arm 53L, grips the decorative material cassette DC1 of the type (first, Dec1) that is used for a subsequent operation from the decorative material accommodating area 209 by the finger members of the right hand 49, and positions and places the decorative material cassette DC1 on the decorative material placement site for operation 210, based on the selected arrangement design data. In this case, the two decorative material cassettes DC1 of the same type are transferred from the decorative material accommodating area 209 to the decorative material placement site for operation 210.

Then, the first arm 53L applies the adhesive to a predetermined position of the hand mirror V from the adhesive gun based on the arrangement position information of the decorative materials on the hand mirror V and returns to the standby position, again. The standby position has been previously set to a position at which the first arm 53L and the second arm 53R are not interfered with each other when the second arm 53R operates to place the decorative materials.

Thereafter, one decorative material Dec1 is sucked from the accommodating small chamber of the decorative material cassette DC1 placed on the decorative material placement site for operation 210 by the suction device of the right hand 49 of the second arm 53R. Then, the decorative material Dec1 is placed at a position of the adhesive that has been applied to the hand mirror V by the adhesive gun.

It is to be noted that the usage order and positions of the respective accommodating small chambers of the decorative material cassettes DC1 and DC2, and the times the decorative materials have been used in the past are recorded in the overall computer system 207. The operation of taking the decorative material and bonding the decorative material to the hand mirror V is executed in accordance with the order. In this manner, the application operation of the adhesive by the first arm 53L and the arrangement operation of the decorative material by the second arm 53R are alternately executed repeatedly for the number of decorative materials Dec1 included in the arrangement design.

If the arrangement operation of the decorative materials Dec1 on the hand mirror V has been completed, the second arm 53R transfers the decorative material cassette DC1 on the decorative material placement site for operation 210 to the decorative material accommodating area 209, takes the decorative material cassette DC2 to be used for the subsequent operation from the decorative material accommodating area 209, and transfers the decorative material cassette DC2 to the decorative material placement site for operation 210.

These operations are repeated and the two decorative material cassettes positioned on the decorative material placement site for operation 210 are changed to the decorative material cassettes DC2 from the decorative material cassettes DC1. The application operation of the adhesive by the first arm 53L and the arrangement operation of the decorative material by the second arm 53R are executed repeatedly for the number of decorative materials Dec2 included in the arrangement design.

The same operations are repeated for the decorative materials Dec3. With this, the arrangement operation of the decorative materials is completed as illustrated in FIG. 22. If the arrangement operation has been completed, the first arm 53L is operated to grip the hand mirror V on which the decorative materials have been arranged with the left hand 48 and transfer the hand mirror V to the product delivery device 204. If a predetermined time (time required to dry the adhesive) has passed, the first arm 53L is operated to unlock the product delivery device 204 with the left hand 48 and deliver the hand mirror V to the customer G as the product.

As described above, with the service providing system according to the embodiment, the decoration processing operation requiring more skilled and precise operations can be replicated with high accuracy in accordance with a request from a customer. This makes it possible to improve the worth of the product to be provided. Furthermore, the decoration processing of more diverse designs can be performed by increasing stocks of the arrangement design data and the like.

Third Embodiment

Subsequently, the third embodiment is described. In the embodiment, a robot barista system is described as an example of the service providing system. In the robot barista system, decoration processing is performed on coffee drink poured into a cup in accordance with an ordered design and the obtained coffee drink is provided to a customer.

It is to be noted that the embodiment is configured to have the same drift as that in the first embodiment other than a point that contents in the material supply devices and an operation mode of the robot are different from those in the above-described first embodiment. Therefore, description of the same configurations is omitted and the same reference numerals denote the same constituent components.

Figure 23:
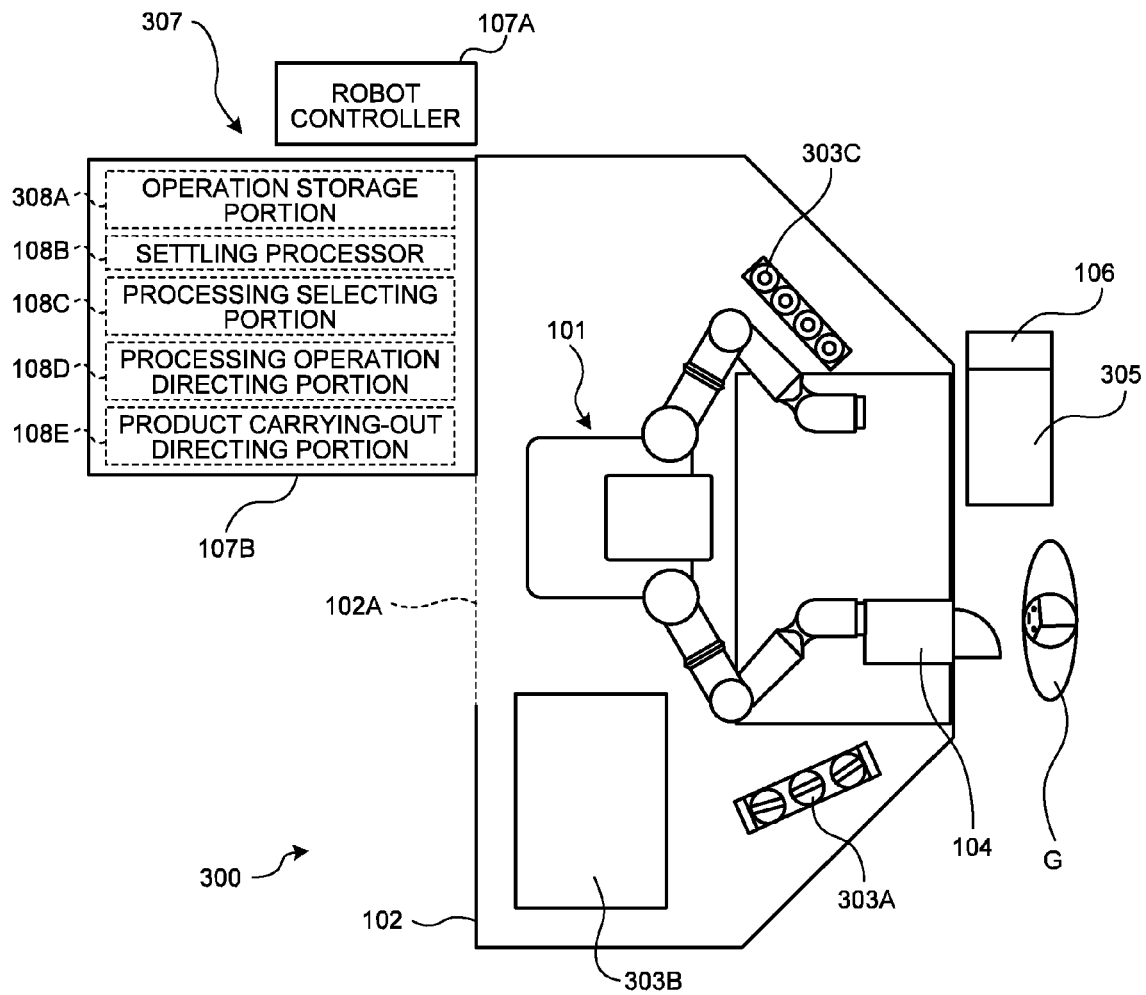
FIG. 23 is a schematic top view for explaining a service providing system according to a third embodiment.

As illustrated in FIG. 23, in a service providing system 300 according to the embodiment, a material supply device 303A is a cup dispenser in which a plurality sizes of drink cups C are stocked. A material supply device 303B is a coffee maker for normal service.

A material supply device 303C is a topping dispenser in which a plurality types of toppings (cocoa powder, whipped cream, and the like) are put. An overall computer system 307 has the same configuration as that in the first embodiment. However, pieces of decoration design data with the types of toppings corresponding to the selected type of cup C are stored in an operation storage portion 308A as operation information of the robot unit 101.

Furthermore, a size selection screen and a decoration selection screen are displayed on an order input screen that is displayed on an input touch panel 305. Selection of the size (amount) of the cup C is received on the size selection screen. A plurality of types of serving modes (arrangement designs) with arrangement of the toppings such as the cream and the cocoa powder are displayed and a desired arrangement mode is made to be selected on the decoration selection screen.

The service providing system 300 according to the embodiment is configured as described above. If order contents by the customer G are fixed, the robot unit 101 operates to take a drink cup C of a size in accordance with the selected content from the material supply device 303A with the right hand 11 of the second arm 3R, and operates the material supply device 303B to pour the coffee drink corresponding to the selected size into the drink cup C.

The first arm 3L operates in parallel with the operation of the second arm 3R to grip the topping dispenser corresponding to the content selected by the customer G from the material supply device 303C with the left hand 12. Thereafter, the second arm 3R takes the predetermined posture and positions the drink cup C in a state of gripping the drink cup C. Then, the second arm 3R executes a serving operation with the toppings on the drink cup C by the first arm 3L gripping the topping dispenser in accordance with the serving mode selected by the customer G.

Figure 24:
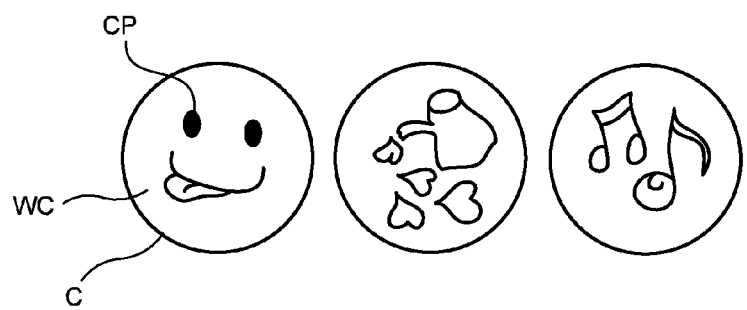
FIG. 24 is a schematic top view for explaining an example of an arrangement design according to the third embodiment.

In the embodiment, first, whipped cream is poured uniformly on the coffee drink in the drink cup C with the operation with the left hand 12. Next, the topping dispenser for the cocoa powder CP is switched to be gripped from the material supply device 303C with the operation with the left hand 12. Then, an operation of arranging the cocoa powder CP on the whipped cream WC in accordance with the design as illustrated in FIG. 24 is executed.

As described above, with the service providing system according to the embodiment, the processing operation of the coffee product requiring precise operations can be replicated stably with high accuracy by storing operations of the skilled crafts (baristas) previously. This makes it possible to improve the worth of the product to be provided.

Hereinbefore, the embodiments have been described. However, the embodiments can be changed variously. For example, in the embodiments, as the products or services to be provided to a customer, the preparation of the soft-serve ice cream and the provision of the obtained soft-serve ice cream to the customer, the decoration processing on the hand mirror and the provision of the obtained hand mirror to the customer, and the decoration operation on the cup drink and the provision of the obtained cup drink to the customer are described as examples. However, the invention is not limited to the provision of these products and can be used for provision of various services.

Furthermore, a configuration in which a product such as a mobile phone or a T-shirt that is possessed by the customer is supplied to the housing through the carrying-in/out port and order input information is input through the interface so as to perform installation processing of decorative materials and the like on the supplied substance may be employed, for example. In addition, products other than those as described in the embodiments, such as the preparation and the provision of cocktail drink, may be processed (prepared) and provided. Furthermore, as the settling unit, the settling method is not limited to money charger and a configuration in which various settling methods can be selected may be employed.

Furthermore, in the embodiments, the controller and the external computer are configured as separate bodies so as to constitute the overall computer system as the control unit. However, the control unit may be configured as a functional element of one computer or the control unit may be configured by combining a plurality of computers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A service providing system comprising:
   a robot unit including first and second robots;
   a base material accommodating portion that accommodates a base material of a product;
   a small member accommodating portion that accommodates one or more types of decorative members to be bonded to the base material;
   an adhesive supply tool accommodating portion that accommodates an adhesive supply tool;
   an operation stage on which the base material is capable of being positioned and placed at a predetermined position;
   a housing surrounding the robot unit;
   a carrying-in/out port through which the product is capable of being carried in/out to an inner side and an outer side of the housing;
   a first door that partitions between the housing and the carrying-in/out port;
   a second door that partitions between the carrying-in/out port and an outer side of the service providing system;
   an interface that is configured to receive input of order input information; and
   a control unit that is connected to the robot unit and the interface and causes the robot unit to execute a decoration operation on the base material on the basis of the order input information input by the interface,
   wherein the control unit comprises:
      an operation storage portion that is configured to store therein pieces of arrangement position information indicating a plurality of arrangement positions of the one or more types of decorative members on the base material;
      a processing selecting portion that is configured to select the arrangement position information from the information on arrangement positions stored in the operation storage portion on the basis of the order input information from the interface;
      a processing operation directing portion that causes the robot unit to execute:
         an operation of taking the base material from the base material accommodating portion, and placing the base material on the operation stage;
         an operation of applying an adhesive to positions of the base material on the operation stage with the adhesive supply tool based on the arrangement position information selected by the processing selecting portion; and an operation of placing the decorative members taken out from the small member accommodating portion at places to which the adhesive has been applied; and a product carrying-out directing portion that is configured to carry out the product on which processing has been performed by the processing operation to the outer side of the housing through the carrying-in/out port when the processing operation has been completed, and wherein the product carrying-out directing portion causes the robot unit to execute:

an operation of opening the first door by using the first robot;

an operation of delivering the product from the inner side of the housing to a predetermined position between the first and second doors by using the second robot while opening the first door by using the first robot; and an operation of closing the first door by using the first robot.

2. The service providing system according to claim 1, wherein the robot unit includes:
a foundation;
a first arm that has a plurality of joints;
a second arm that is a separated body from the first arm and has a plurality of joints; and
body portion that is installed on the foundation so as to revolve and supports the first arm and the second arm.

3. The service providing system according to claim 1, wherein the robot unit includes at least a manipulator having seven degrees of freedom.

4. The service providing system according to claim 1, wherein the processing selecting portion causes the interface to display a plurality of types of arrangement designs of the decorative members on the base material, so that a desired arrangement design is made to be selected.

5. The service providing system according to claim 4, wherein
an input port that receives input of data of the arrangement designs is provided on the interface,
the processing selecting portion is configured to be capable of selecting data of the arrangement designs to be input from the input port as an arrangement design on the base material, and
the control unit further comprises an arrangement design creating portion that is configured to create arrangement coordinate data of the decorative members replaced with the arrangement position information on the basis of the arrangement design data input from the input port.

6. The service providing system according to claim 5, wherein
the processing selecting portion is configured to make the interface display a plurality of types of base materials and select a desired material, and
the arrangement design creating portion is configured to determine whether bonding of the decorative members to the selected type of the base material can be performed by using the arrangement coordinate data and to make the interface display an effect that the bonding cannot be performed when it is determined that the bonding cannot be performed.

7. The service providing system according to claim 5, further comprising:

a decorative material placement site for operation that is provided at a position closer to the operation stage with respect to the small member accommodating portion; and a plurality of small member accommodating cassettes for respectively accommodating different types of the decorative members in the small member accommodating portion, wherein the control unit is configured to control the robot unit to take types of small member accommodating cassettes to be used for a last operation, among the small member accommodating cassettes, from the small member accommodating portion and to place the types of small member accommodating cassettes on the decorative material placement site for operation, and to take the decorative members from the small member accommodating cassettes placed on the decorative material placement site for operation and to bond the decorative members to the base material.

8. The service providing system according to claim 1, further comprising a product delivery device that includes:
a partitioning member that partitions between a robot unit side and an outer side;
a communicating member that communicates with the partitioning member;
a robot-side partitioning member that partitions between the communicating member and the robot unit side;
a first opening/closing mechanism that opens/closes the robot-side partitioning member;
an outer-side partitioning member that partitions between the communicating member and the outer side;
a second opening/closing mechanism that opens/closes the outer-side partitioning member;
a movement member that is capable of performing a reciprocating operation of reciprocating in the communicating member; and
a product placement portion that is provided to the movement member.

9. The service providing system according to claim 8, wherein the movement member includes a movement mechanism that causes the robot unit to perform the reciprocating operation.

10. The service providing system according to claim 8, wherein the product delivery device includes an opening/closing adjusting unit that prohibits the first opening/closing mechanism and the second opening/closing mechanism from being made into opened states at the same time.

11. The service providing system according to claim 9, wherein the control unit includes:
an operation directing portion that causes the robot unit to perform an operation relating to a product based on a predetermined operation procedure; and
a delivery directing portion that checks whether the second opening/closing mechanism is in an opening-prohibited state when the operation has been completed, and if the second opening/closing mechanism is in the opening-prohibited state, makes the first opening/closing mechanism into an opened state, places the product on the product placement portion, and causes the robot unit to move the movement mechanism to the outer side.

12. The service providing system according to claim 9, wherein the robot unit includes:
an operation directing portion that causes the robot unit to perform an operation relating to a product based on a predetermined operation procedure; and
a delivery directing portion that checks whether the second opening/closing mechanism is in an opening-prohibited state when the operation has been completed, and if the second opening/closing mechanism is in the opening-prohibited state, makes the first opening/closing mechanism into an opened state, places the product on the product placement portion, and causes the robot unit to move the movement mechanism to the outer side.

13. The service providing system according to claim 1, wherein the interface includes:
   a display screen that displays a plurality of types of specifications of the product that are stored in the control unit; and
   an order input screen that receives input of the specification of the product from the display screen.

14. The service providing system according to claim 13, wherein
   the order input information includes one or more pieces of set information for one product, and
   the order input screen is configured to be capable of receiving the one or more pieces of set information for the one product.

15. The service providing system according to claim 1, wherein the first and second robots are first and second arms of a dual-arm robot, respectively.

\* \* \* \* \*